(12) United States Patent
Bradley et al.

(10) Patent No.: US 7,376,242 B2
(45) Date of Patent: May 20, 2008

(54) QUANTIZATION-BASED DATA EMBEDDING IN MAPPED DATA

(75) Inventors: Brett A. Bradley, Portland, OR (US); John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 849 days.

(21) Appl. No.: 10/742,637

(22) Filed: Dec. 19, 2003

(65) Prior Publication Data

US 2004/0228502 A1 Nov. 18, 2004

Related U.S. Application Data

(63) Continuation-in-part of application No. 10/469,474, filed as application No. PCT/US02/08844 on Mar. 22, 2002.

(60) Provisional application No. 60/480,990, filed on Jun. 23, 2003, provisional application No. 60/435,401, filed on Dec. 19, 2002, provisional application No. 60/278,049, filed on Mar. 22, 2001.

(51) Int. Cl.
*H04K 1/00* (2006.01)

(52) U.S. Cl. ........................ 382/100; 713/176

(58) Field of Classification Search ................ 382/100, 382/232, 251; 358/3.28; 713/176; 380/287, 380/54
See application file for complete search history.

(56) References Cited

U.S. PATENT DOCUMENTS

| | | | |
|---|---|---|---|
| 3,406,344 A | 10/1968 | Hopper | 325/50 |
| 3,845,391 A | 10/1974 | Crosby | 325/64 |
| 4,313,197 A | 1/1982 | Maxemchuk | 370/111 |
| 4,425,661 A | 1/1984 | Moses et al. | 375/1 |
| 4,939,515 A | 7/1990 | Adelson | 341/51 |
| 4,943,973 A | 7/1990 | Werner | 375/1 |

(Continued)

FOREIGN PATENT DOCUMENTS

EP 0 903 942 A2 * 3/1999

(Continued)

OTHER PUBLICATIONS

Ogawa et al., "Digital Watermarking Technique for Motion Pictures Based on Quantization," IEICE Trans. Fundamentals, vol. E83-A, No. 1, Jan. 2000, pp. 77-89.*

(Continued)

*Primary Examiner*—Andrew W. Johns

(57) ABSTRACT

Novel methods and systems for quantization based data embedding and reading in host signals, such as image, audio and video signals. To embed auxiliary data in a host signal, an embedder maps the host signal from a first domain into a mapped signal in a second domain that is robust to a class of amplitude modifications that are order preserving. The embedder performs quantization based embedding of auxiliary data into the host signal using quantization bins derived from the second domain that are robust to the amplitude modifications. The mapping improves the robustness of the data embedding method by increasing the chances that the embedded data can be recovered by an auxiliary data reader after amplitude modifications. A related embedding method projects the mapped signal unto a vector, and specifically, a pseudorandom vector. It performs quantization based embedding on the projected signal. The use of this projection provides added robustness of the embedded data to noise and other forms of distortion.

38 Claims, 17 Drawing Sheets

U.S. PATENT DOCUMENTS

| | | |
|---|---|---|
| 5,010,405 A | 4/1991 | Schreiber et al. .......... 358/141 |
| 5,319,735 A | 6/1994 | Preuss et al. .............. 395/2.14 |
| 5,404,377 A | 4/1995 | Moses ......................... 375/200 |
| 5,450,490 A | 9/1995 | Jensen et al. ................... 380/6 |
| 5,613,004 A | 3/1997 | Cooperman et al. .......... 380/28 |
| 5,649,054 A | 7/1997 | Oomen et al. .............. 395/2.14 |
| 5,774,452 A | 6/1998 | Wolosewicz ................ 370/212 |
| 5,822,360 A | 10/1998 | Lee et al. ................... 375/200 |
| 5,822,432 A | 10/1998 | Moskowitz et al. .......... 380/28 |
| 5,848,155 A | 12/1998 | Cox ............................. 380/4 |
| 5,889,868 A | 3/1999 | Moskowitz et al. .......... 380/51 |
| 5,905,800 A | 5/1999 | Moskowitz et al. .......... 380/28 |
| 5,915,027 A | 6/1999 | Cox et al. .................... 380/54 |
| 5,933,798 A | 8/1999 | Linnartz ..................... 702/191 |
| 5,937,000 A | 8/1999 | Lee et al. ................... 375/200 |
| 5,940,135 A | 8/1999 | Petrovic et al. ............. 348/473 |
| 5,940,429 A | 8/1999 | Lam et al. ................... 375/200 |
| 5,945,932 A | 8/1999 | Smith et al. .................. 341/51 |
| 6,031,914 A | 2/2000 | Tewfik et al. ................. 380/54 |
| 6,061,793 A | 5/2000 | Tewfik et al. ............... 713/176 |
| 6,078,664 A | 6/2000 | Moskowitz et al. .......... 380/28 |
| 6,104,826 A | 8/2000 | Nakagawa et al. ......... 382/100 |
| 6,122,403 A | 9/2000 | Rhoads ....................... 382/233 |
| 6,185,312 B1 | 2/2001 | Nakamura et al. .......... 382/100 |
| 6,219,634 B1 | 4/2001 | Levine .................... 704/200.1 |
| 6,226,387 B1 | 5/2001 | Tewfik et al. ............... 382/100 |
| 6,233,347 B1 | 5/2001 | Chen et al. ................. 382/100 |
| 6,240,121 B1 | 5/2001 | Senoh ........................ 375/130 |
| 6,278,385 B1 | 8/2001 | Kondo et al. ................. 341/50 |
| 6,282,299 B1 | 8/2001 | Tewfik et al. ............... 382/100 |
| 6,314,192 B1 | 11/2001 | Chen et al. ................. 382/100 |
| 6,332,030 B1 | 12/2001 | Manjunath et al. ......... 382/100 |
| 6,332,194 B1 | 12/2001 | Bloom et al. ............... 713/176 |
| 6,359,985 B1 | 3/2002 | Koch et al. ................... 380/54 |
| 6,396,937 B2 | 5/2002 | Chen et al. ................. 382/100 |
| 6,400,826 B1 | 6/2002 | Chen et al. ................. 382/100 |
| 6,477,276 B1 | 11/2002 | Inoue et al. ................ 382/232 |
| 6,483,927 B2 | 11/2002 | Brunk et al. ................ 382/100 |
| 6,493,457 B1 | 12/2002 | Quackenbush et al. ..... 382/100 |
| 6,570,996 B1 | 5/2003 | Linnartz ..................... 382/100 |
| 6,580,809 B2 | 6/2003 | Stach et al. ................. 382/100 |
| 6,614,914 B1 | 9/2003 | Rhoads et al. .............. 382/100 |
| 6,751,337 B2 | 6/2004 | Tewfik et al. ............... 382/100 |
| 6,768,980 B1 | 7/2004 | Meyer et al. ............... 704/500 |
| 6,834,345 B2 | 12/2004 | Bloom et al. ............... 713/176 |
| 6,901,514 B1 | 5/2005 | Iu et al. ..................... 713/176 |
| 6,973,574 B2 | 12/2005 | Mihcak et al. .............. 713/180 |
| 7,006,555 B1 | 2/2006 | Srinivasan .................. 375/133 |
| 2001/0029580 A1 | 10/2001 | Moskowitz ................. 713/176 |
| 2001/0049788 A1 | 12/2001 | Shur ........................ 713/179 |
| 2002/0044659 A1 | 4/2002 | Ohta ......................... 380/241 |
| 2002/0106104 A1 | 8/2002 | Brunk et al. ................ 382/100 |
| 2002/0114463 A1 | 8/2002 | Pelly et al. .................. 380/210 |
| 2002/0126872 A1 | 9/2002 | Brunk et al. ................ 382/100 |
| 2002/0154778 A1 | 10/2002 | Mihcak et al. .............. 380/262 |
| 2002/0172394 A1 | 11/2002 | Venkatesan et al. ........ 382/100 |
| 2002/0191811 A1 | 12/2002 | Kamijo ...................... 382/100 |
| 2003/0133590 A1 | 7/2003 | Miller et al. ................ 382/100 |
| 2005/0105760 A1 | 5/2005 | Eggers et al. ............... 382/100 |

FOREIGN PATENT DOCUMENTS

| | | |
|---|---|---|
| GB | 2196 167 A | 4/1988 |
| WO | WO98/53565 A1 | 11/1998 |
| WO | WO 99/60514 A1 | 11/1999 |
| WO | WO00/00969 A1 | 1/2000 |
| WO | WO00/22745 A1 | 4/2000 |
| WO | WO 00/65536 A1 | 11/2000 |
| WO | WO02/089056 A1 | 11/2002 |

OTHER PUBLICATIONS

Eggers et al., "Quantization Watermarking," Proc. SPIE vol. 3971: Security and Watermarking of Multimedia Contents II, Jan. 2000, pp. 60-71.*

Lu et al., "Digital image watermarking technique based on vector quantization," IEEE Electronics Letters, vol. 36, No. 4, Feb. 17, 2000, pp. 303-305.*

Chen, "Design and Analysis of Digital Watermarking, Information Embedding, and Data Hiding Systems" Ph.D. Thesis at Massachusetts Institute of Technology, Jun. 2000.*

Jo et al., "A Digital Image Watermarking Scheme Based on Vector Quantisation," IEICE Trans. Inf. & Syst., vol. E85-D, No. 6, Jun. 2002, pp. 1054-1056.*

Huang et al.; "A VQ-Based Robust Multi-Watermarking Algorithm," IEICE Trans. Fundamentals, vol. 85-A, No. 7, Jul. 2002, pp. 1719-1726.*

Pérez-González et al., "Improving Data Hiding Performance by Using Quantization in a Projected Domain," Proc. IEEE Int. Conf. on Multimedia and Expo, vol. 2, Aug. 2002, pp. 565-568.*

Chen et al., "Dither modulation: a new approach to digital watermarking and information hiding," Proc. SPIE vol. 3657: Security and Watermarking of Multimedia Contents, Jan. 1999, pp. 342-353.

Chen et al., "An Information-Theoretic Approach to the Design of Robust Digital Watermarking Systems," IEEE Proc. Int. Conf. on Acoustics, Speech, and Signal Processing, Mar. 1999, pp. 2061-2064.

Chen et al., "Achievable Performance fo Digital Watermarking Systems," IEEE Proc. Int. Conf. on Multimedia Computing and Systems, Jun. 1999, pp. 13-18.

Chen et al., "Provably robust digital watermarking," Proc. SPIE vol. 3845: Multimedia Systems and Applications II, Sep. 1999, pp. 43-54.

Chen et al., "Preprocessed and postprocessed quantization index modulation methods for digital watermarking," Proc. SPIE vol. 3971: Security and Watermarking of Multimedia Contents II, Jan. 2000, pp. 48-59.

Gang et al., "Periodic Signaling Scheme in Oblivious Data Hiding," IEEE Proc. 34.sup.th Asilomar Conf. on Signals, Systems, and Computers, Oct./Nov. 2000, pp. 1851-1855.

Brunk, "Quantizer characteristics important for Quantization Index Modulation," Proc. SPIE vol. 4314: Security and Watermarking of Multimedia Contents III, Jan. 2001, pp. 686-694.

Chen et al., "Quantization Index Modulation Methods for Digital Watermarking and Information Embedding of Multimedia," Journal of VLSI Signal Processing, vol. 27, Feb. 2001, pp. 7-33.

Chen et al., "Quantization Index Modulation: A Class of Provably Good Methods for Digital Watermarking and Information Hiding," IEEE Transactions on Information Theory, vol. 47, No. 4, May 2001, pp. 1423-1443.

Komatsu, "A Proposal on Digital Watermark in Document Image Communication and Its Application to Realizing a Signature", Nov. 5, 1990, Electronics and Communications in Japan, Part 1, vol. 73, No. 5, pp. 22-33.

Matsui , "Video-Steganography: How to Secretly Embed a Signature in a Picture", Proc. Technological Strategies for Protecting Intellectual Property in the Networked Multimedia Environment, vol. 1, issue 1, Jan. 1994, pp. 187-205.

Tanaka, "A Visual Retrieval System With Private Information for Image Database", Oct. 1, 1991, Proceeding Int. Conf. On DSP Applications and Technology, pp. 415-421.

Haitsma et al., Audio Watermarking for Monitoring and Copy Protection, ACM Multimedia Workshop, 2000, pp. 119-122.

Schreiber et al., "A Compatible High-Definition Television System Using the Noise-Margin Method of Hiding Enhancement Information," SMPTE Journal, Dec. 1989, pp. 873-878.

Swanson et al., "Data Hiding for Video-in-Video," 1997 IEEE, pp. 676-679.

Tewfik, Data Embedding Imagery and Its Applications, AFRL Presentation, Jul. 1998.

Tewfik, "Data Embedding in Imagery," AFRL Presentation, Feb. 1999.

Zhu et al., "Image Coding by Folding," Proc. Int. Conf. on Image Processing, vol. 2, pp. 665-668, Oct. 1997.

Ten Kate, "Digital audio carrying extra information", ICASSP-90, pp. 1097-1100, Apr. 3, 1990.

Meerwald, "Quantization Watermarking in the JPEG2000 Coding Pipeline," Communications and Multimedia Security Issues of the New Century: Proc. IFIP Conf. on Communications and Multimedia Security, May 2001, pp. 69-79.

* cited by examiner

Before affine transformation

After affine transformation

| REF | Q | REF |
|-----|---|-----|
| Q   | Q | Q   |
| REF | Q | REF |

Fig. 10

QUANTIZATION-BASED DATA EMBEDDING IN MAPPED DATA

RELATED APPLICATION DATA

This patent application is a continuation in part of U.S. application Ser. No. 10/469,474, filed Jun. 14, 2004, which is the U.S. Nationalization of PCT Application No. PCT/US02/08844 (published as WO02/078234), filed Mar. 22, 2002, which claims priority to U.S. patent application Ser. No. 09/895,867, filed Jun. 28, 2001 (now U.S. Pat. No. 6,483,927), which claims priority to U.S. Provisional Application 60/278,049, filed Mar. 22, 2001, which are herein incorporated by reference.

This patent application also claims priority to U.S. Provisional Applications 60/435,401, filed Dec. 19, 2002, and 60/480,990, filed Jun. 23, 2003, which are hereby incorporated by reference.

This patent application is related to U.S. patent application Ser. No. 10/105,013, filed Mar. 22, 2002 (now U.S. Pat. No. 6,580,809), which is hereby incorporated by reference.

TECHNICAL FIELD

The invention relates to multimedia signal processing, steganography and data hiding.

BACKGROUND AND SUMMARY

Digital watermarking is a process for modifying physical or electronic media to embed machine-readable auxiliary data into the media. The media may be modified such that the embedded code is imperceptible or nearly imperceptible to the user, yet may be recovered through an automated reader process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 60/256,629 and U.S. Pat. Nos. 6,122,403 and 6,614,914 which are hereby incorporated by reference.

One category of data hiding methods embeds auxiliary data by quantizing samples or other features of a media signal such that the quantized sample falls within a quantization bin corresponding to a desired auxiliary message symbol. The message symbols may be binary or M-ary. Preferably, the modification made to the sample to move it into the quantization bin is constrained to stay within a desired perceptual distortion tolerance. This perceptual distortion tolerance enables the auxiliary data to be hidden in a manner that is imperceptible to the viewer or listener of embedded media content. One form of such auxiliary data embedding and reading is referred to as Quantization Index Modulation or QIM. Examples of this form of data hiding is disclosed in WO9960514A1: SYSTEM, METHOD, AND PRODUCT FOR INFORMATION EMBEDDING USING AN ENSEMBLE OF NON-INTERSECTING EMBEDDING GENERATORS and corresponding U.S. Pat. No. 6,233,347; which are hereby incorporated by reference.

To read embedded data, the samples of content expected to include auxiliary data are evaluated to determine which quantizer or quantization bin they represent. Symbol errors may result when samples get mapped to a different quantizer or quantization bin relative to the one used to encode them. Error correction encoding tends to mitigate symbol errors if the distortion is not significant or does not impact the embedded data adversely.

Quantization embedding techniques may be performed on samples or other signal features in various signal or transform domains of multimedia signals. To reduce the impact of distortion, the embedding domain may be chosen such that samples in that domain are relatively robust or invariant to expected types of distortion.

A challenge associated with data hiding methods, including quantization embedding techniques, is synchronizing the reader with the embedded data after the host signal carrying the embedded data has been distorted, e.g., geometrically or temporally distorted. Such forms of distortion have the effect of distorting the quantization bins. Thus, if the same quantizers or bins are used to interpret embedded data symbols in the reader as in the embedder, the reader may map distorted samples to the wrong quantizer or bin. Additional types of distortion that specifically effect quantization embedding techniques include the addition of an unknown offset or multiplication by an unknown gain.

This document details methods of synchronizing embedded data readers in quantization embedding systems for multimedia content. In the embedder, a reference signal and message symbols are encoded using a quantization embedding method. In the reader, the distorted data samples are evaluated to derive quantizers or quantization bins. The reader then uses the derived quantization information to convert the distorted data to raw symbol estimates. These raw symbol estimates are then evaluated to detect the presence of the reference signal. Once detected, the reference signal is used to determine the distortion and compensate for it by adjusting the quantization information or distorted data such that message symbols may be decoded more accurately.

Certain forms of offset and gain distortion make it difficult to recover hidden data embedded in an audio or image signal by quantization techniques. To compensate for this offset and gain distortion, an embedded data reader analyzes a statistical distribution (e.g., a histogram) of feature samples in an audio or image signal suspected of having hidden auxiliary data to derive an estimate of quantizers used to encode a reference signal (deriving an estimate of the quantizers is equivalent to estimating the offset and gain distortions). The estimated quantizers then recover the reference signal, and the reader uses the reference signal to determine and compensate for geometric or temporal distortion, like spatial scaling and rotation of image data, and time scale and speed changes of audio data. After compensating for such distortion, the reader can then more accurately recover hidden message data using quantization techniques to extract the message. The reference signal is preferably repeated in blocks of the image or audio data to enable synchronization at many points in an image or audio data stream.

The disclosure also describes a method of hiding auxiliary data in a media signal such that the auxiliary data is humanly imperceptible yet recoverable by an automated auxiliary data reader. This method comprises segmenting the media signal into regions, determining statistics for the regions, and adapting quantization bins for each region based on the statistics calculated for the region. To hide auxiliary data in the regions, the method quantizes signal characteristics in the regions into the quantization bins adapted for the regions. The quantization bins correspond to auxiliary data symbols and the signal characteristics are quantized into selected bins depending on the auxiliary data symbol to be embedded in the signal characteristics.

A compatible method for reading the embedded data segments the media signal into regions, determines statistics for the regions, and based on the statistics for each region, adapts quantization bins for the region. To extract auxiliary data hidden in the regions, the method maps signal characteristics in the regions into the quantization bins adapted for the regions. The quantization bins correspond to auxiliary data symbols, and thus symbols are extracted depending on which bins the signal characteristics map into. In the embedding method, the signal characteristics have been quantized into selected bins depending on the auxiliary data symbols embedded in the signal characteristics.

Further features will become apparent with reference to the following detailed description and accompanying drawings.

BRIEF DESCRIPTION OF THE DRAWINGS

FIG. 10 shows an example of an image segment comprised of a three by three pixel region.

DETAILED DESCRIPTION

Synchronization in Quantization Based Data Hiding Systems

This section describes techniques for synchronizing auxiliary data readers in quantization based data embedding systems.

Figure 1:
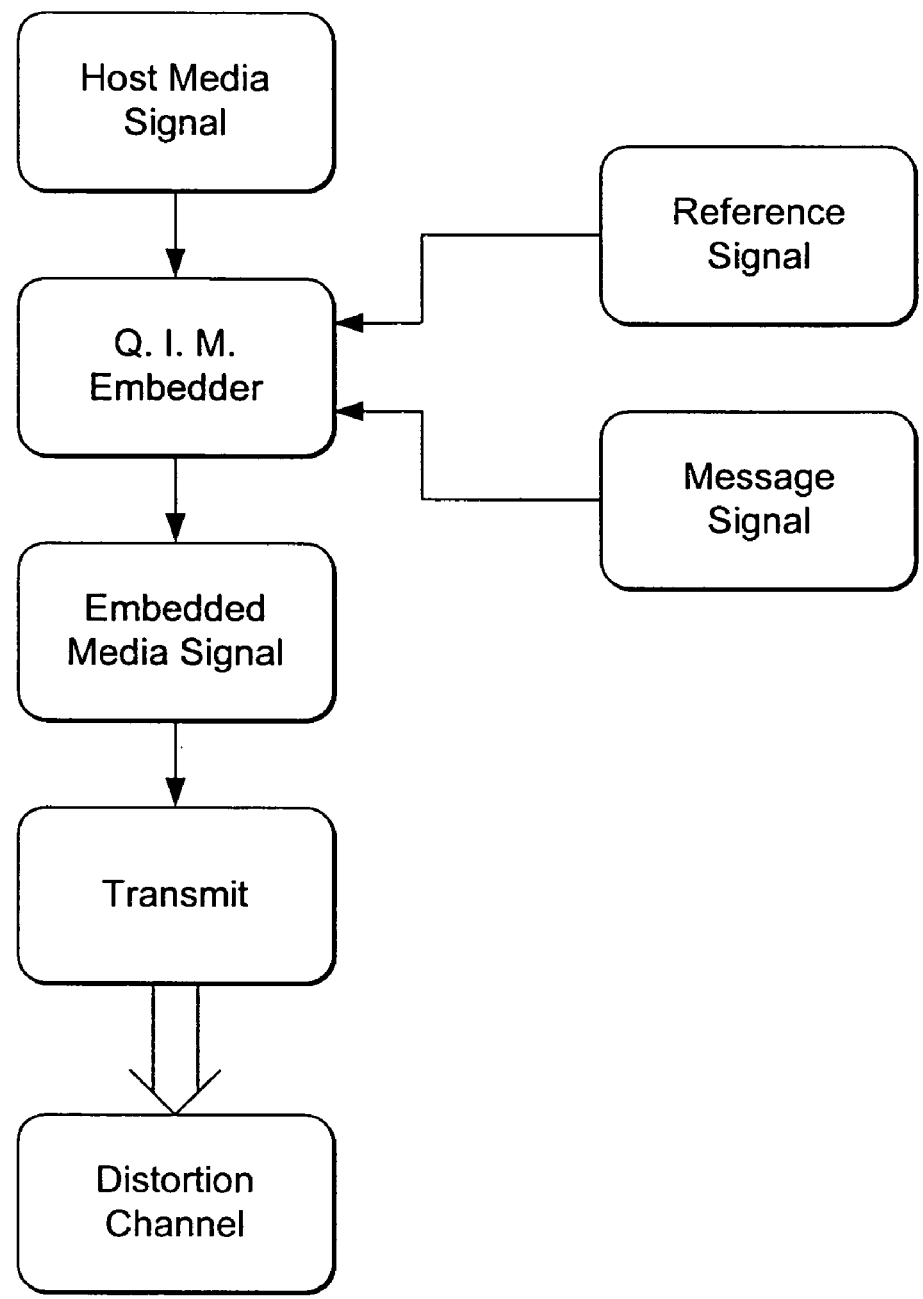
FIG. 1 is a diagram of a quantization type steganographic embedder that embeds a hidden reference signal in media signals for synchronization.

FIG. 1 is a diagram illustrating a quantization type data embedder that embeds a reference signal for synchronization. The embedder receives a host media signal such as a block of audio or image data. For the sake of illustration, we describe embedders that operate on samples in the spatial domain of a digital image block (e.g., luminance samples) and the time domain of a digital audio block. Alternatively, the block of image data may be transformed into samples in a DCT, DWT, DFT, Fourier Mellin, Gabor, autocorrelation or some other transform domain. The block of audio data similarly may be transformed into subbands, frequency coefficients, a time-frequency spectrogram, autocorrelation domain, etc. In such cases, the quantization embedder modifies samples in the transform domain, and an inverse transform returns the data to its perceptual domain for rendering in a form that is visible or audible to humans.

In some implementations, the embedder may be integrated with audio or image compression operators that transform the signal into a frequency domain, remove data in a lossy quantization process, and perform some form of entropy coding on the resulting data block. In this case, the quantization type data embedder operates on the frequency domain data after lossy compression.

In an embodiment for images, the reference signal comprises a two-dimensional array of binary symbols (1, 0). Similarly, the message signal comprises a two-dimensional signal of binary symbols. The reference signal has frequency domain characteristics that facilitate its detection while minimizing its impact on perceptible distortion in the embedded image. In particular, the reference signal comprises an array of impulse functions in a transform domain (e.g., autocorrelation domain, Fourier domain). These impulse functions have pseudorandom phase. When transformed to the transform domain, the reference signal has peaks that are detected using peak detection methods (such as those described later in this document), and then aligned with reference peaks to calculate orientation parameters, such as rotation and scale. The detected peaks are aligned with reference peaks using correlation filtering.

In an embodiment for audio data, the reference signal comprises either a one-dimensional or a two-dimensional array of binary symbols (1, 0). The two dimensional form refers to an implementation where the audio block is transformed to a 2D spectrogram, and the samples in the 2D reference signal correspond to samples in the 2D spectrogram. Similarly, the message signal comprises either a one or a two-dimensional signal of binary symbols. The reference signal has characteristics that facilitate its detection while minimizing its impact on perceptible distortion in the embedded audio block. In one implementation, the reference signal comprises a PN sequence. Like the image case above, the reference signal may have transform domain characteristics that facilitate detection of the reference signal in a transform domain.

For an example of embedding data in a spectrogram of an audio signal, see U.S. patent application Ser. No. 09/661,900, filed Sep. 14, 2000, entitled WATERMARKING IN THE TIME-FREQUENCY DOMAIN, which is hereby incorporated by reference. Quantization based embedding and reading of steganographic data as described in this document and those incorporated by reference may be performed in the time-frequency domain as detailed in application Ser. No. 09/661,900. In particular, the calibration and/or synchronization signals described in Ser. No. 09/661,900 may be embedded and read using the techniques described in this document.

The message signal is preferably error correction encoded. Some examples of error correction codes include convolutional codes, turbo codes, and BCH codes.

The message signal may be integrated with the reference signal, such as by convolving or multiplying it with the reference signal. For example, the reference signal may serve as a carrier signal for the message signal, where the reference signal is used to spread spectrum modulate the message signal in a multiplication, convolution, exclusive OR or exclusive NOR operation combining the message and reference signal. For example, the message signal may be formed into a signal that has reference peaks in a transform domain, such as the autocorrelation domain or Fourier domain. These reference peaks serve as a reference signal to enable detection by correlating a transformed version of extracted message data with a known reference signal.

The message and reference signal may be embedded in mutually exclusive samples of the host media signal such that the two signals do not overlap. Alternatively, the message and reference signal may be embedded in feature sample domains that overlap.

The quantization type embedder reads the reference and message signals and maps elements in these signals to corresponding samples in the host signal block. If the message and reference signals are combined (e.g., by multiplication or convolution), then the embedder operates on the elements of the composite message and reference signal. It then quantizes the corresponding host sample according to the binary symbol to be encoded. One binary symbol corresponds to a first quantizer, while the other binary symbol corresponds to a different quantizer. The selected quantizer modifies the corresponding sample to fall within a bin for that quantizer that minimizes the distortion to the sample.

The above auxiliary data embedders trade-off perceptual distortion and robustness by adjusting the size and spacing between quantization bins. These embedders may be implemented using uniform scalar quantizers. For example, each binary symbol is associated with a quantizer having bins of width delta and offsets relative to bins of the other symbol of delta/2. This simple form of quantizer facilitates the derivation of the quantizer parameters in the reader.

Different types of quantizers may be used for the reference and message signals. In particular, the reference signal is embedded using a scalar quantizer, while the message signal is embedded with a vector quantizer (e.g., a trellis coded vector quantizer).

Figure 2:
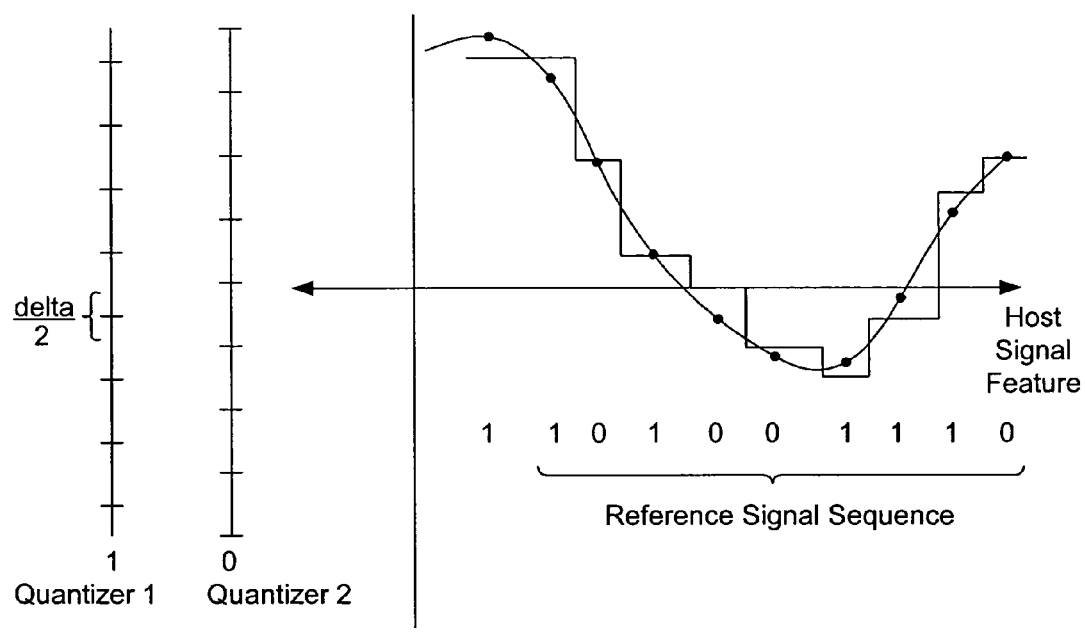
FIG. 2 is a diagram illustrating an example of quantizers for embedding binary symbols of a hidden reference signal by quantizing host signal features into quantization bins corresponding to the binary symbols.

FIG. 2 shows an example of quantizers for embedding a binary reference signal by quantizing features of the host media signal. One quantizer has a series of bins of size delta that correspond to a first binary symbol, while the other quantizer has a series of bins of size delta, offset by a distance delta/2 relative to the first quantizer, that correspond to a second binary symbol. The host signal feature, which has a value varying over some dimensions, such as time, space, time and space, frequency or frequency band, etc. is quantized at discrete samples to fall within a quantization bin corresponding to the reference signal values to be encoded in those samples. In this example, the reference signal comprises the sequence 110 100 1, and is repeated in the host signal features of the block being encoded.

The reference signal does not have to be represented as a binary sequence. For example, if the implementer wants the reference signal to vary smoothly over time or space, he can choose a larger symbol alphabet, where each symbol has a corresponding quantizer. Each of these quantizers can be represented as another quantizer axes in FIG. 2.

Figure 3:
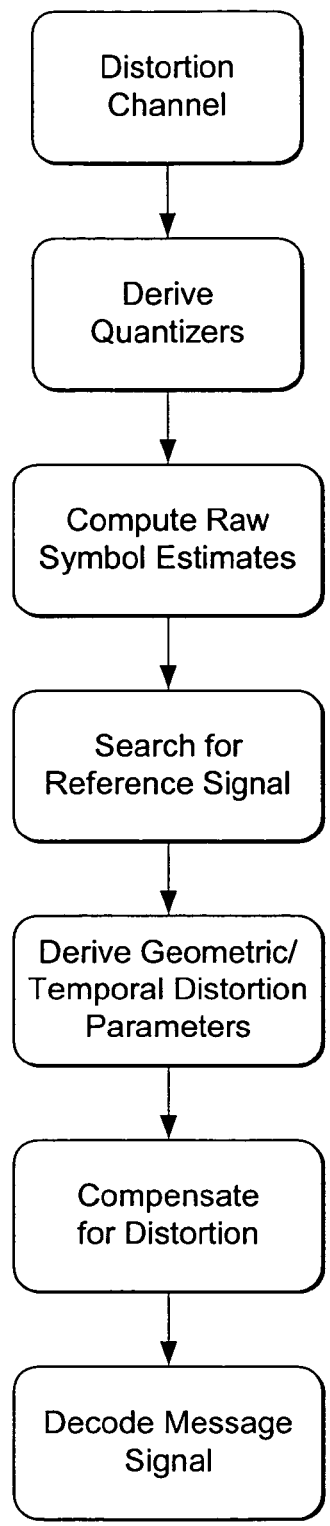
FIG. 3 is a diagram of a quantization type steganographic reader that uses the hidden reference signal to synchronize reading operations.

FIG. 3 is a diagram illustrating an auxiliary data reader that uses the reference signal to compensate for geometric/temporal distortions in an embedded media signal. The embedded media signal is received from a distortion channel, sampled and segmented into blocks. The distortion channel imposes geometric and/or temporal distortions on the embedded media signal.

First, the reader derives the quantizers for the embedded media signal. In an embodiment for images, the reader performs a statistical analysis of the watermarked feature samples to produce a statistical distribution of the samples from which quantization bins can be estimated. In particular, it creates a histogram for a block of sampled image data, such as the one shown in FIG. 4. The histogram assigns image feature samples to bins based on their values. The spacing between the bins provides an approximate spacing for the bins of the quantizers of the symbols used to encode the reference signal. It is not yet clear which quantizer corresponds to which binary symbols.

As noted above, the relative distance between bins in the embedder is delta/2. Due to the distortion of the watermarked signal, the distance between bins is now alpha*(delta/2), where alpha is a factor that represents the scaling of the watermarked signal due to distortion.

Based on an analysis of the histogram, the reader assumes a first assignment of quantizer to symbol, and then applies the quantizers to the samples to get raw estimates of the embedded symbols. It then searches for the reference signal in the output of the quantizers. In particular, it correlates the reference signal with the signal formed by the raw estimates to detect the presence of the reference signal in the embedded media signal.

As a specific example for images, consider the case where the reference signal forms peaks in the Fourier magnitude domain. The reader performs an FFT on the image formed by the raw estimates to get Fourier magnitude data and then transforms the data to log polar coordinates. The reader correlates the transformed data in the log polar space with a log polar representation of the reference signal. The location of maximum correlation provides an estimate of scale and rotation.

In a general case, if the correlation peak is not greater than a threshold, such as an absolute threshold or a threshold relative to the next highest peak, then the reader tries the alternative quantizer symbol assignment. If neither quantizer assignments yield an acceptable amount of correlation with the reference signal, then the reader considers embedded data not to be present. In the special case where the difference between one quantizer assignment and another is a phase shift, then a correlation process need not be executed for each possible quantizer assignment because the correlation is performed in the Fourier magnitude domain, where phase information is not used.

If the reference signal is deemed to be present, the reader uses the rotation and spatial scale distortion parameters to realign the image block. A process of correlation-based matched filtering can be used, along with knowledge of the embedded reference signal phases, to estimate the translation distortion undergone by the embedded image. The quantizers used to encode the message symbols are then used to decode the embedded message signal. As noted, this may include generating raw symbol estimates for samples in the block and then performing error correction decoding to recover the message signal.

A similar approach may be used for audio signals. Consider an example where the reference signal is a pseudorandom number (PN) sequence of binary symbols. The reader uses the derived quantizers to convert the audio block to raw symbol estimates. It then correlates the PN sequence with the raw symbol estimates to determine whether the reference signal is present in the media signal. The reference signal has peaks in the frequency domain to ascertain time scale. In particular, the signal formed from the raw estimates is transformed into a frequency domain. If the reference signal is present, there should be tell-tale peaks, which could be shifted due to time scale modifications (time scale modification, linear speed increases/decreases). The position of the peaks relative to the reference peaks provides an estimate of the time scaling distortion. Then any time-shift distortion may be estimated by correlating the reference signal to the (re-scaled) media signal. The reader uses this estimate to re-align the audio data and then applies the quantizers used for message symbols to extract the message signal.

The above examples refer to quantizing image sample or audio sample features to encode a reference signal and a message signal. The reference and message signal may be encoded in different feature samples, temporal/spatial resolutions, frequency bands, etc. For example, the reference signal may be encoded in time domain samples at a particular sampling rate for audio, or spatial domain samples at a particular sampling rate for images (still and video). The message signal, on the other hand, may be encoded in other transform domain samples, such as subbands, wavelet coefficients, DCT coefficients, DFT coefficients, a log polar or log-log coordinate system mapped from a time-frequency spectrogram, frequency domain, temporal domain, or spatial domain, etc.

The reference and message signals can be encoded in any of a variety of domains created by transforming the signal from its perceptual domain to another transform domain. This new domain may represent features of host signal, such as power, autocorrelation, energy, phase, etc. that are particularly robust to expected forms of distortion, yet enable the embedded data to remain imperceptible in the perceptual domain of the watermarked signal. Preferably, the transform domain for encoding the reference and message signals should be selected so that the quantized features are relatively invariant or robust to expected forms of distortion for the application of the watermarking system.

Synchronization Using Curve Fitting

This section describes a method for elliptical curve fitting and related applications. One application is to compute affine transform parameters that describe geometric transformation to an image. In particular, this approach inserts a circular pattern (or multiple circular patterns) into an image, and after the image undergoes geometric transformation distorting the circle, the elliptical curve fitting technique fits the distorted circle to an ellipse and derives the affine transform parameters that characterize the distortion. These parameters may then be used to reverse the distortion and return the image to its original geometric state. This particular method may be used in digital watermarking applications, where a watermark encoder embeds the circular pattern in a manner that makes it imperceptible or substantially imperceptible to a viewer of the image. A watermark decoder then recovers elements of the circular pattern, fits them to an ellipse and derives the affine transform parameters.

A circle in a plane has the property that any affine transformation applied to the plane will transform the circle into an ellipse. A linear transformation (i.e., without translation) applied to the circle centered at the origin will transform it into an ellipse also centered at the origin. Another property of a circle pattern is that it is rotationally invariant. The advantage of this property is that estimation of rotation can be delayed until the rest of the affine parameters (scale, differential scale and shear) have been estimated.

An equation of a circle in a plane is, $$x^2+y^2=r^2 \quad\quad\quad 1$$

where, r is the radius of the circle.

Applying an affine transformation (with zero translation) to the circle can be represented by a change in the coordinate system $$\begin{bmatrix}x\\y\end{bmatrix} = \begin{bmatrix}c_1 & c_2\\c_3 & c_4\end{bmatrix}\begin{bmatrix}x'\\y'\end{bmatrix} \quad\quad\quad 2$$

The parameters $c_i$ determine the affine transformation.

Substituting the expressions for x and y from Equation 2 into Equation 1, and simplifying, one gets the equation $$\frac{x'^2}{\left(\frac{r^2}{c_1+c_3}\right)} + \left(\frac{c_1c_2+c_3c_4}{r^2}\right)x'y' + \frac{y'^2}{\left(\frac{r^2}{c_2+c_4}\right)} = 1 \qquad 3$$

which is the geometrical equation of an ellipse. This ellipse is centered at the origin and the major axis angle of the ellipse makes an arbitrary angle with the X-axis of the new coordinate system.

Figure 5:
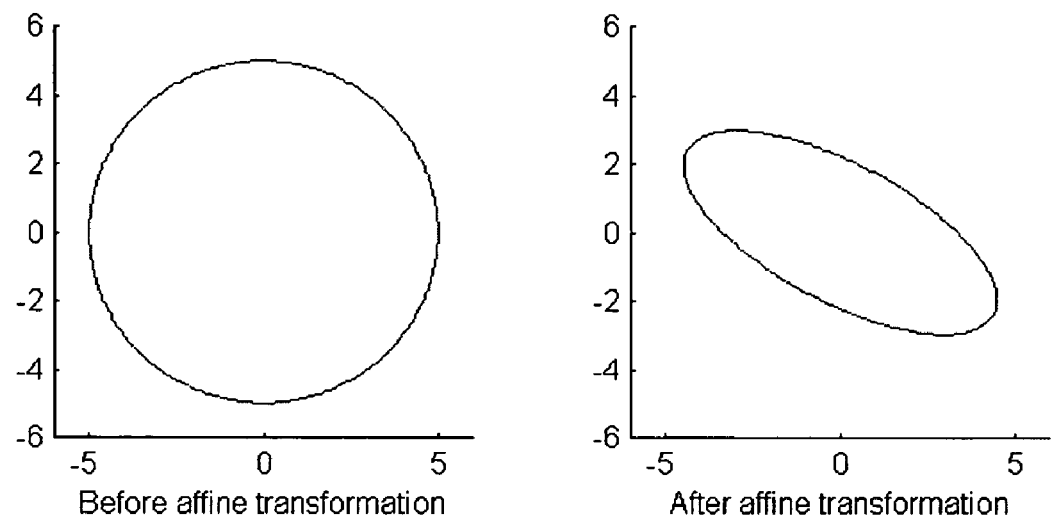
FIG. 5 illustrates an affine transformation of a circle in a plane into an arbitrary ellipse.

FIG. 5 illustrates an affine transformation of a circle in a plane into an arbitrary ellipse. An automated software or hardware detector can compute the affine transform from knowledge of the parameters of the circle (radius) before applying the transformation and knowledge of the parameters of the ellipse (major axis, minor axis, major axis rotation) after applying the transformation.

The following sections illustrate such a method for computing in the context of a digital image watermark embedder and reader.

Embedder

Figure 6:
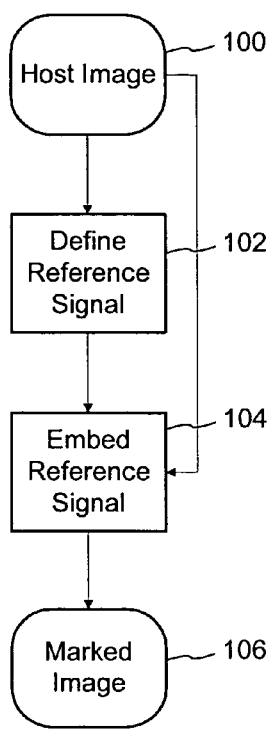
FIG. 6 is a flow diagram illustrating an example of a watermark embedder that embeds a substantially imperceptible circular reference signal into a host image.

FIG. 6 is a flow diagram illustrating an example of a watermark embedder that embeds a substantially imperceptible circular reference signal into a host image. The embedder starts with a host image 100. The embedder defines a reference signal to be embedded into the image so that the reference signal is substantially imperceptible or imperceptible (102). This reference signal is typically pre-defined, but it may also be adapted to the host image or to an auxiliary message (such as an N bit binary or M-ary code) to be embedded into the image.

The reference signal is comprised of elements that form a circle in a particular domain, such as the spatial image domain, the spatial frequency domain, or some other transform domain. For the sake of an example, consider a case where the elements are impulse or delta functions in the Fourier magnitude domain. The reference signal comprises impulse functions located at points on a circle centered at the origin of the Fourier transform magnitude. The points are randomly scattered along the circle, while preserving conjugate symmetry of the Fourier transform. The magnitudes of the points are determined by visibility and detection considerations. To obscure these points in the spatial domain and facilitate detection, they have known pseudorandom phase with respect to each other. The pseudorandom phase is designed to minimize visibility in the spatial domain.

In this implementation, the definition of the reference signal only specifies that the points should lie on a circle in the Fourier magnitude domain. For this circular grid, the choice of the radius of the circle and the distribution of the points along the circle are application specific. For example, in applications dealing with high resolution images, the radius can be chosen to be large such that points are in higher frequencies and visibility in the spatial domain is low. For a typical application, the radius could be in the mid-frequency range to achieve a balance between visibility requirements and signal-to-noise ratio considerations.

The distribution of points along the circle can be random or based on a quadrant or octant symmetry as needed by the application. Points on the circle should be selected such that they are as close to the integer lattice as possible. This will reduce the errors during the ellipse fitting and estimation process required for determining the affine transform parameters.

Figure 7:
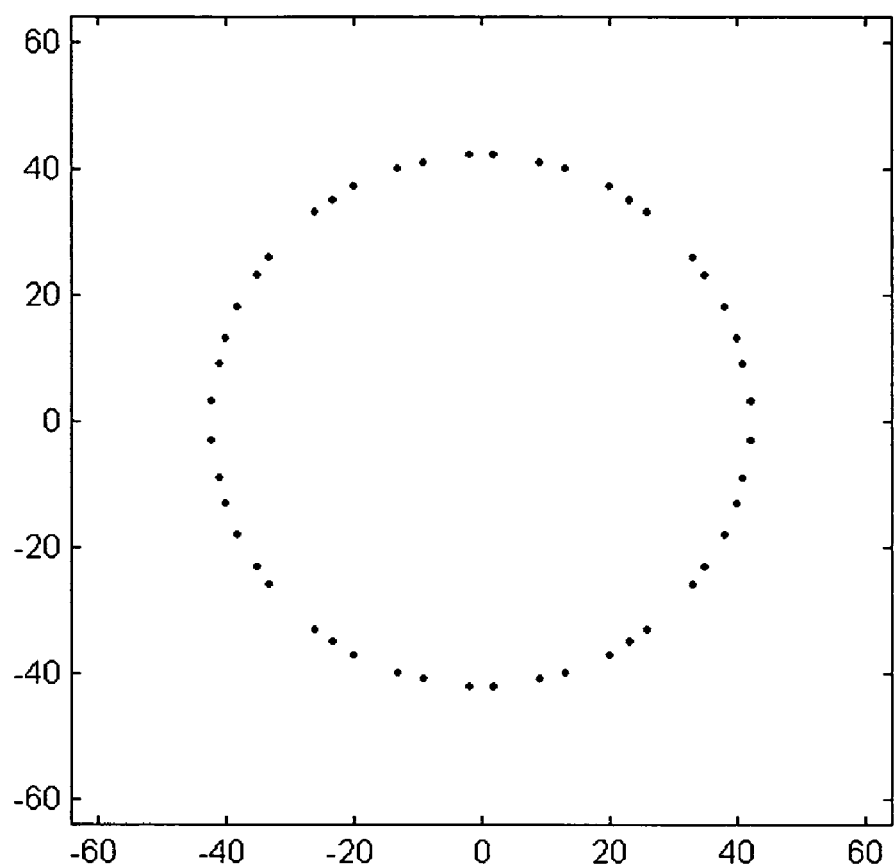
FIG. 7 is a flow diagram illustrating an example of a circular reference signal in the Fourier magnitude domain.

For this particular approach, it may be more advantageous to have fewer points with higher energy than to have several grid points with lower energy. Higher energy points will be easier to locate and isolate in the Fourier magnitude domain of a watermarked image. FIG. 7 illustrates an example of a circular reference signal in the Fourier magnitude domain.

The embedder embeds the reference signal into the image (104). One way to embed the reference signal is to add it to the host image in the spatial image domain, or in the Fourier domain. To reduce the perceptibility of the reference signal, the samples of the signal in the spatial or spatial frequency domain may be perceptually adapted to the hiding characteristics of the host image. For example, the samples may be multiplied by corresponding elements in a gain vector whose elements are functions of the signal activity in a local neighborhood of samples around those being modified by the embedding of the reference signal. The greater the signal activity (e.g., busyness or texture), the better the data hiding characteristics of the image. Preferably for digital watermarking applications where perceptibility is a design constraint, the gain vector elements are a function of sensitivity to the human perceptual system. The lower the sensitivity, the higher the gain.

Another way to embed the reference signal is to quantize sample values in the image according to an embedding function that defines how elements in the reference signal are to be mapped quantization levels or quantizers. For example, the presence of a reference signal element may be set at one quantizer or set of quantization levels, and the absence of a reference signal element may be set to a second quantizer or set of quantization levels. This embedding may be performed using scalar quantizers on spatial domain samples, for example. To encode the reference signal, a sample or group of samples at a particular element in a circular pattern are quantized using a first quantizer. The other samples are quantized using a second quantizer.

Regardless of the specifics of the embedding process, the result is a marked image (106) carrying the reference signal in the form of a circular pattern. The embedding process may be repeated in discrete blocks of the image. For example, the image may be tiled into 256 by 256 pixel blocks at particular resolution, like 300 or 600 dpi, and the embedder may embed the reference signal into each tile.

Detector

Figure 8:
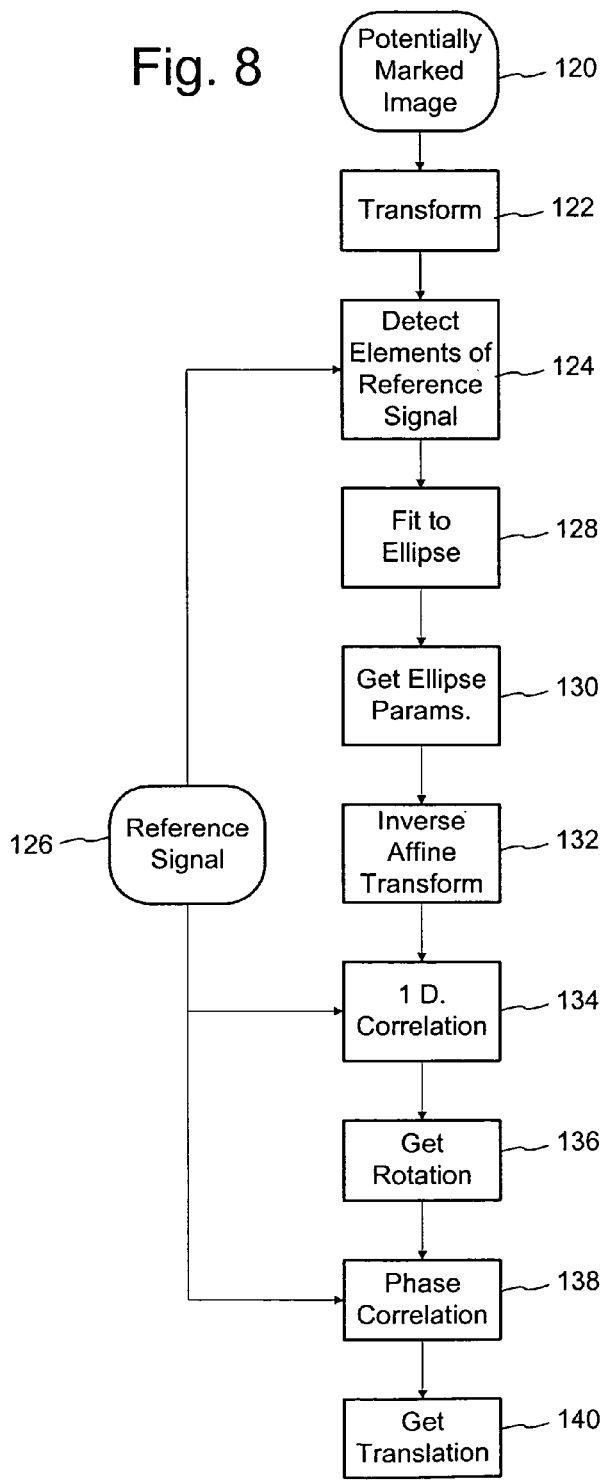
FIG. 8 is a flow diagram illustrating a detector compatible with the embedder of FIG. 6.

FIG. 8 is a flow diagram illustrating a detector compatible with the embedder of FIG. 6. The detector receives a potentially marked image 120, for example, by scanning an image of a printed object suspected of having a marked image. The scanning process, along with other image processes, typically introduce some geometric distortion represented as an affine transform, or at least locally affine (e.g., piece wise linear geometric distortion).

For the sake of illustration, consider the case where the embedder inserted the reference signal as a circular pattern of impulse functions in the Fourier magnitude domain. In this case, the detector transforms the image into the Fourier magnitude domain (122). Of course, if the embedder defines the circular pattern in some other domain, the detector transforms the image into that domain.

Next, the detector detects elements of the reference signal by identifying the highest magnitude impulse signals in the transform domain (124). This process may include one or more pre-processing steps to enhance detection of the circular elements and differentiate them from the host image. Examples of these steps include summing blocks of the image and filtering the samples in the image to de-correlate the reference signal from the host image. Blocks may be summed in a transform domain, such as the Fourier domain, depending on the domain in which the reference pattern is embedded. For example, if the circular pattern is in the Fourier magnitude domain, the detector may sum blocks in the Fourier magnitude domain. The detector knows the characteristics of the reference signal (126), such as the frequencies, number, and location of the elements in the circular pattern. It uses this criteria to pre-process the image and identify candidate points in the pattern.

First, a filter is used to de-correlate the reference signal from the host image. The detector applies this filter to the image and then computes the Fourier magnitude of the resulting image. The filter helps in accentuating reference signal points. One example of this type of de-correlating filter operates as follows. For each image sample, it compares the sample with each of its eight neighboring image samples. The filter replaces the value at the center sample with a value that is incremented each time the center sample value is greater than a neighbor value and decremented each time the center sample is less than the neighbor value. In particular, for each comparison, the filter increments by a value of 1 if the center sample is greater than its neighbor, it increments by a value of −1 if the center sample is less than its neighbor, and makes no change otherwise. The output of the filter will be between −8 and +8 when an eight neighborhood (3 by 3 sample region) is used in the filter implementation. Such type of a filter has a number of applications such as edge detection, signal enhancement, etc. in signal processing and operates on different media types (image, video and audio) and samples in various domains. For digital watermark applications, it may be used to estimate the original host signal and watermark signal, where the watermark signal is applied as an additive, antipodal PN signal.

The filter discussed in the previous paragraph may be implemented in variety of ways. One particular implementation makes comparisons between the center sample and each neighboring sample, and transforms the result of this comparison to an increment or decrement value (e.g., +k or −k, where k is a constant like 1, 2, 3, etc.). The filter sums each of the increment/decrement values from each neighbor, and then replaces the center sample value with the result of the summation. This type of filter can be implemented efficiently using a look up table. For example, the comparison operation is performed by subtracting the center sample value from a neighbor sample value to produce a difference value (−255 to +255 for an 8 bit sample). The result is then fed to a look-up table, which maps the difference value to an increment/decrement value and outputs that value. The filter sums the look-up table output for each neighbor in the neighborhood, and replaces the center sample with the result of the summation. This neighborhood may be the eight neighbors in 3 by 3 block of samples, the adjacent samples in a one-dimensional signal, the horizontally and/or vertically adjacent neighbors in a two or more dimensional signal, etc. The size of the neighborhood may be increased as well. The look-up table may be used to implement a variety of non-linear filters efficiently.

In this implementation, reference signal detection comprises extracting peaks from the Fourier magnitude data. There are numerous approaches for peak detection and extraction. For example, one could isolate points with high energy relative to the average energy in the Fourier magnitude plane. Alternatively, one could isolate points with high energy in a small local region. Statistical measures such as the mean, median, variance, etc. are usually employed to reliably detect peaks. One example of a peak detection and extraction strategy is described by Nicolas Devillard. See N. Devillard, "Infrared jitter imaging data reduction algorithms," Jun. 21, 1999, which is herein incorporated by reference.

After the de-correlation process, the detector proceeds with peak extraction as follows. Let $\mu$ be the mean of all values in the Fourier magnitude plane. Let $\sigma$ be the average absolute deviation from the median. A binary image the same size as the Fourier magnitude plane is created by assigning one to all pixels which have a value above $T=\mu+k\sigma$ and zero to all other pixels. The term k is an adjustable parameter that depends upon the amount of noise. In our implementation a value of k=10 was used. The threshold T is repeatedly reduced by a factor of k $\sigma$/100 until the number of peaks found is just greater than N, where N is the number of points in the circular reference signal pattern. The non-zero points in the binary image are the extracted peaks.

The detector then fits the extracted peaks to an ellipse (128). The particular method is a variation of the least squares approach described by Fitzgibbon et al. See, A. Fitzgibbon, M. Pilu, R. Fisher "Direct least-square fitting of Ellipses," International conference on Pattern Recognition, Vienna, August 1996; Extended version available as DAI Research Paper #794; and M. Pilu, A. Fitzgibbon, R. Fisher "Ellipse-specific Direct least-square Fitting," IEEE International Conference on Image Processing, Lausanne, September 1996, which are each herein incorporated by reference. For this approach, it is beneficial to reflect the extracted points over the entire Fourier magnitude plane, taking care of the conjugate symmetry. Reflecting the points before feeding them to the ellipse fitting algorithm will ensure a better least squares ellipse fit. Note that reflection is not a necessary condition, the approach could also be applied to points located in a portion (e.g. half plane or quarter plane) of the Fourier domain.

The ellipse fitting procedure in this implementation is based on the least squares ellipse-fitting technique proposed by Fitzgibbon et al. This technique uses a direct least squares method to fit an ellipse to a set of data points in a plane. The technique is based on using the singular value decomposition to minimize the algebraic distance between an ellipse and the data points subject to elliptical constraints. The solution is non-recursive and always yields an ellipse.

Once the detector has found the ellipse, it derives the parameters of the ellipse (130). From these parameters, the detector derives affine transform parameters that represent the distortion between the reference circle and the distorted reference circle (i.e. the ellipse) found in the potentially marked image.

The equation of the ellipse is specified in terms of the affine parameters and the radius of the circle (which is known, since the reference signal was based on it). Till this stage, the detector ignores the rotation of the points. The detector knows that the points lie on the fitted ellipse, but does not know where they lie with respect to the original reference signal. A partial affine transformation can be computed from the parameters of the fitted ellipse. We call this transformation partial since it does not include the effects of rotation. Next, the detector performs an inverse geometric transform of the candidate points into the shape of a circle (132). The detector applies an inverse affine transform to the image such that the fitted ellipse in the Fourier magnitude domain is converted into a circle with the same radius as the radius of the reference signal. The detector then recovers the rotation angle parameter. In one approach for getting rotation, the detector samples along the detected circle, and performs a one dimensional correlation (134) to find the rotation angle. In particular, the detector samples the Fourier magnitude along this circle to obtain a sampled 1-dimensional signal. This 1-D signal contains peaks corresponding to the reference signal points. The detector gets the rotation angle (136) by a 1-D correlation between this signal and the 1-D signal corresponding to the reference signal Fourier magnitude sampled along the reference signal circle. The detector computes the rotation angle from the correlation peak offset. Alternatively, rotation can be recovered using a Fourier-Mellin procedure in the log-polar domain. For this approach, the partial affine transform estimated from the ellipse is inverted and applied to the frequency domain data so that the extracted points lie on a circle but are rotated with respect to the reference signal. Rotation is recovered through correlation in the log-polar domain. The estimated rotation, along with the partial affine parameters estimated from the ellipse are then combined to give the full affine transform parameters.

Having determined these affine parameters, the detector may use these parameters to correct for differential scale and rotation in the spatial domain or some other domain, and then perform additional stages to get other parameters, such as translation. In particular, the detector may perform phase correlation (138) (e.g., phase only match filtering) between the reference signal and the marked signal, corrected for scale, shear and rotation distortion. The coordinates of highest correlation provide the translation parameters (140).

In the case where the watermark embedder inserts the reference signal using quantization modulation as described above, the detector first performs a quantization to convert image samples into a binary image representing the presence or absence of the reference signal. The detector then fits the detected reference signal to an ellipse, and derives the affine parameters as described above.

Figure 4:
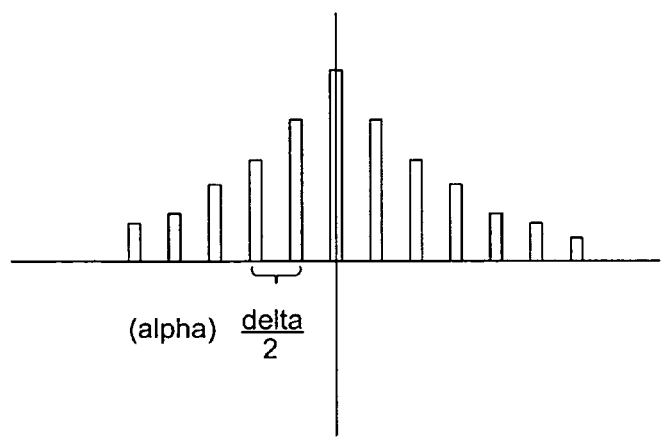
FIG. 4 is a diagram of a histogram used to estimate quantizers from a distorted or corrupted media signal suspected of being embedded with hidden data by a quantization type steganographic embedder.

Images having the reference signal can undergo severe degradation due to image manipulations or noise. Such degradation can adversely affect the estimation of the affine parameters. Noise or degradations can cause spurious peaks to appear in the Fourier magnitude domain. The ellipse-fitting technique of Fitzgibbon et al. is substantially affected by spurious points that are not on the ellipse. Even a few spurious points can alter the ellipse-fitting result to such an extent that the resulting affine parameters are not accurate enough for successful watermark detection and decoding. There are a number of potential enhancements to the method described above. To improve the method, one implementation discards outliers in the ellipse fitting process as follows:

1. start with $N_i$ reference point candidates detected in stage 124 of FIG. 4;
2. get the best ellipse fit for the $N_i$ points; this is ellipse $E_i$;
3. compute distance from each point to $E_i$;
4. sort $N_i$ points by distance from $E_i$ in descending order;
5. discard point that is at the maximum distance from the ellipse $E_i$;
6. if the difference between the ellipse fit at the previous iteration and the current iteration is less than $\epsilon$, go to Step 9
7. $N_{i+1}=N_i-1$
8. increment i; i=i+1
9. go to Step 2 for next iteration
10. stop Another modification to this approach includes using knowledge of the reference signal to discard points that are highly unlikely to be part of the reference signal.

An initial implementation of the above method uses 12 reference points in a quarter plane of the Fourier magnitude space. The embedder subdivides the image into 128 by 128 blocks and transforms the blocks into a 128 by 128 Fourier magnitude space. As a further enhancement, each of the N points extracted in stage 124 may be assigned a weight according to their magnitude value and location in the Fourier transform domain. These weights could then be incorporated within the ellipse fitting procedure to improve both the robustness as well as the accuracy of the fit.

As a further enhancement, the reference signal may be designed to carry auxiliary, hidden information. For example, each reference point may correspond to a message value. A particular sequence of reference points at a particular distance from each other on the reference circle may be used to signal a start of a message. Then, the remaining reference points can be used to carry multiple bits of information. For example, the presence of reference points at particular locations may correspond to binary values. Error correction coding and decoding may be used to encode the message symbols and decode the message symbols. Multiple circles may be encoded into the content by tiling the circles in blocks of image data (e.g., putting a circle in each block).

Further, information may be encoded by representing different messages using different arrangements of circles.

As a further enhancement, each tile of the watermark signal could contain a unique arrangement of points along a circle, with the radius of the circle being constant in all tiles.

As a further enhancement, the reference signal may be used as an indicator of another watermark signal, or even convey key information, specifying how or where to decode another watermark signal. For example, the reference signal may be used as a calibration signal that enables the detector to determine the affine transform parameters, correct for the distortion, and then decode a message signal from the image data (e.g., a spatial or frequency domain watermark message signal).

The reference signal may be used in video signals in a similar fashion. For example, the reference signal may be encoded into the spatial domain or spatial frequency domain of selected frames. Also, the reference circle may be encoded in the time-frequency spectrogram of an audio signal.

Locally Adaptive Embedding and Reading Using Quantization

In this section, we describe a digital watermarking method that locally adapts quantization bins based on local characteristics of the host signal. These quantization bins correspond to auxiliary data symbols. To hide an auxiliary data symbol in a host media signal, the embedder alters the value of a characteristic of the host signal such that its value falls within a bin corresponding to the auxiliary data symbol to be encoded. To extract the hidden data symbol, a reader re-computes the quantization bins based on local characteristics of the host signal, maps the characteristic values at particular embedding locations to the locally adapted bins to determine the bin, and then returns the symbol corresponding to that bin. While our examples specifically describe a process for image or video signals, the technique applies to other media types like audio signals.

Figure 9:
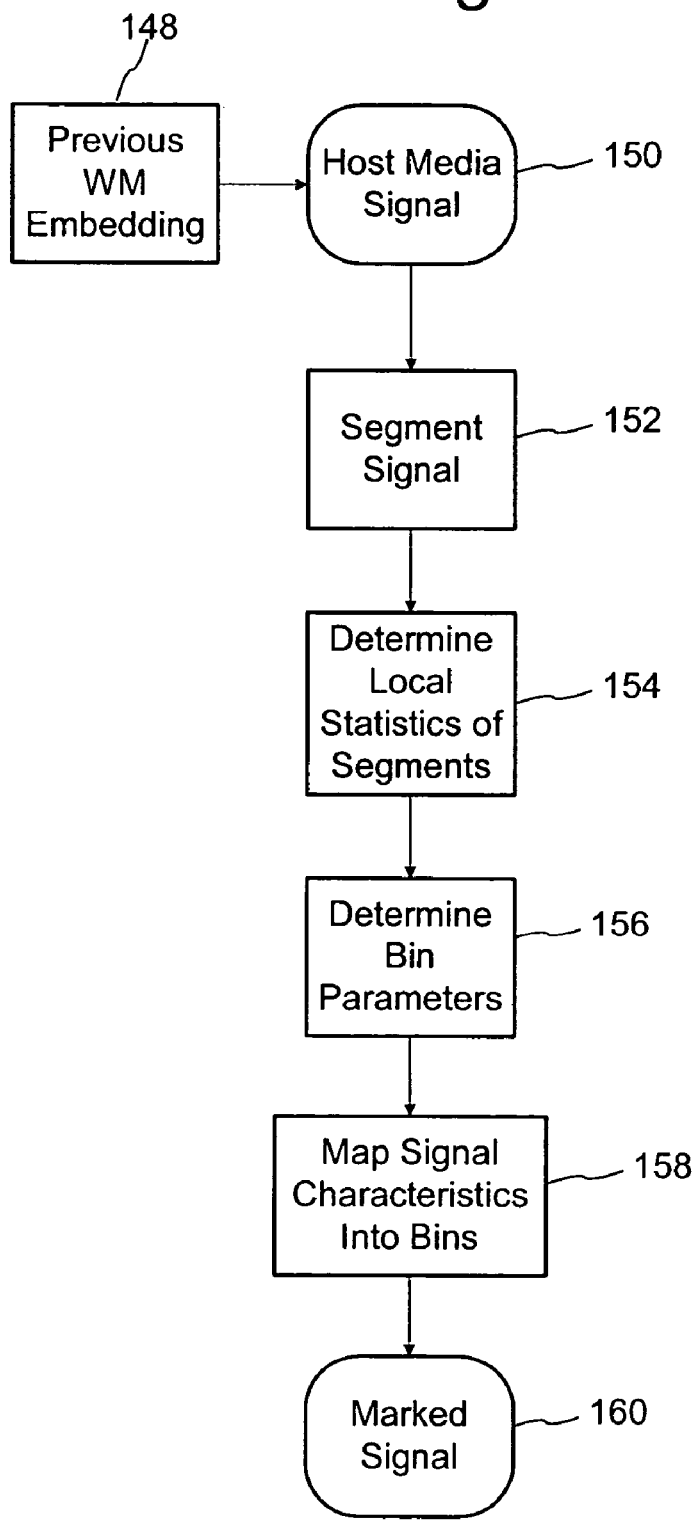
FIG. 9 is a flow diagram illustrating a quantization based embedding scheme where the quantization bins are locally adapted to host signal characteristics.

FIG. 9 illustrates a flow diagram of a quantization based embedding scheme where the quantization bins are locally adapted to host signal characteristics. As we will explain further, our implementation uses a separate watermark to provide additional functionality. As such, the process starts with an initial watermark embedding operation to embed a first watermark signal as shown in block 148. This procedure produces our host media signal 150, which serves as input to the quantization-based embedder.

This embedder begins by segmenting the media signal into blocks (152). These blocks may have a regular or arbitrary shape. In the former case, the media signal may be divided into contiguous blocks of a predetermined dimension. For example, one of our implementations segments spatial domain pixels of an image signal into rectangular blocks.

In the latter case, a segmentation routine may be used to identify regions in the media signal having particular characteristics. For example, the routine may segment noisy from smooth regions or tonal from non-tonal segments. It may segment regions based on similarity of feature values using watershed or morphological segmentation routines, such as those described in co-pending patent application Ser. No. 09/940,872, which is hereby incorporated by reference. One example of a suitable segmentation process is watershed segmentation. See, for example Luc Vincent and Pierre Soille, "Watersheds in Digital Spaces: An efficient Algorithm Based on Immersion Simulations," IEEE Trans. PAMI, Vol 13 No 6, June 1991; and Kari Saarinen, "Watersheds in Color Image Segmentation," IEEE Workshop on Nonlinear Signal and Image Processing (NSIP), Halkidiki, Greece, June 1995, which are hereby incorporated by reference.

Other segmentation approaches may be used as well. Segmentation methods fall into 3 categories, (1) characteristic feature thresholding or clustering, (2) edge detection, and (3) region extraction. See K. S. Fu and J. K. Mui, "A Survey on Image Segmentation," Pattern Recognition, Vol 13, pp3-16, 1981, which is hereby incorporated by reference. Also, within these methods, many techniques can be employed to compute the quantities used in the methods, e.g., statistics, edge filters, morphological filters, Markov random fields (MRF), fuzzy set theory, and neural nets. See Robert Haralick and Linda Shapiro, "Survey: Image Segmentation Techniques," Computer vision, graphics, and image processing, Vol 29, pp 100-132, 1985, which is hereby incorporated by reference.

For images, we recommend use of the watershed algorithm, which falls into the clustering segmentation category due to the inherent robustness we have seen with respect to typical noise and distortion processes for imagery. However, other segmentation methods could be employed for computational or robustness reasons with similar results. Furthermore, these segmentation techniques can be combined or layered for additional robustness in specific applications.

One potential advantage is that the host signal characteristics selected for quantization-based embedding can be chosen based on the characteristics of each region. In this case, the region is mapped into a domain comprising an array of characteristic values for that region. The quantization bins are adapted to the characteristic values of that region. Also, the quantization function parameters, such as the bin sizes and spacing, may be selected based on those characteristics. The quantization bin spacing, for example, may be represented as a non-linear function of the characteristic values of the host signal (e.g., logarithmic).

One benefit of selecting the signal characteristic for embedding based on the characteristics of the region is that the data hiding can be optimized for increased robustness and/or reduced perceptibility based on those characteristics. For example, a first type of quantization function may be used to establish the bins for a noisy region, while a second type of quantization function may be used to establish the bins for a smooth region.

Another potential advantage is that the host signal characteristics and the quantization function that defines the bin structure can be selected based on the distortion channel through which the watermarked signal is expected to travel. For a robust watermark application, the quantization-based watermark is designed to survive the distortion channel for that channel. As such, the signal characteristics and quantization function are selected to survive that channel. Examples of the distortion channel include printing and scanning, compression, digital to analog conversion (and analog to digital conversion), format changes, re-sampling, geometric distortion (including temporal distortions like time scaling), etc.

After segmenting the signal, the embedder determines local statistics of the characteristic values in each segment to be used in hiding auxiliary data (154). Continuing with our example of an image segmented into rectangular blocks, the embedder determines order statistics of selected pixels in each block, such as the minimum, maximum, and median value. From these order statistics, the embedder defines the bin parameters, namely the bin size and spacing. These parameters may be specified in part by a quantization function, which defines quantization bins as a function of the host signal characteristic being modified to hide auxiliary data.

Figure 10:
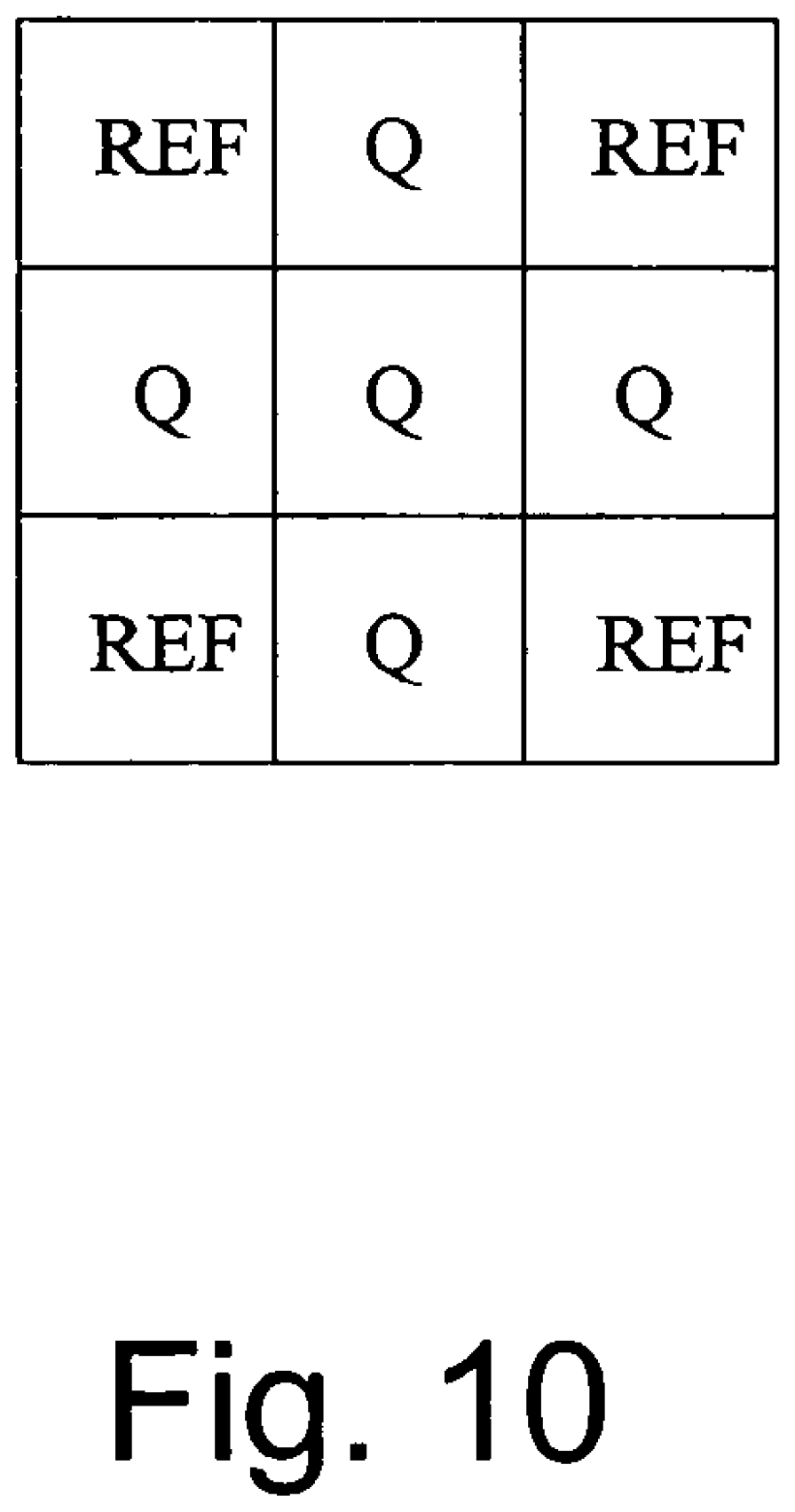

FIG. 10 shows a simple example where an image has been segmented into three by three pixel regions. In this example, each pixel location in the region is either a reference pixel or target pixel to be quantized into a bin to hide auxiliary data. The embedder uses the reference pixel values to compute the local characteristics, such as the minimum and maximum values as well as the median or average. It then sets the quantization bin size as function of the statistics: e.g.,: K(Max−Min), where K is a constant, and Max and Min are the maximum and minimum values of the reference pixels in the region. The median or average may be used to set the quantizer offset. This is just one example; there are many ways to select the quantization function used to establish the bins, including non-linear or linear quantization functions, functions selected based on the region characteristics, etc. Preferably, the reference values, statistics, and quantization function should be selected such that the quantization bins are substantially invariant to the expected distortions of the channel.

While our illustrated scheme employs separate reference and quantization embedding locations, these locations may overlap in some implementations. Depending on the region size, choice of host signal characteristics for embedding, and the quantization function, the reference locations used to compute the statistics may be the same as or at least overlap the embedding locations. The embedding and reference locations may correspond to groups of samples of the host signal that are mutually exclusive yet interleaved as shown, that are partially overlap, or that substantially overlap.

The reference locations may be used to embed a different watermark, such as a detection, calibration, variable message or synchronization watermark. We alluded to this type of digital watermark above with reference to block 148 in FIG. 9. These types of watermarks may be distinct or one in the same. Again, the embedding locations of the separate watermark and the quantization-based watermark may be mutually exclusive, overlap partially, or substantially overlap. We provide specific examples of this separate watermark in the discussion of the reader below.

Returning to FIG. 9, the embedder proceeds to embed auxiliary data symbols by adjusting the characteristic value of an embedding location so that it falls within a quantization bin associated with the symbol to be encoded (158). Each embedding location may encode one auxiliary binary data symbol. Alternatively, groups of embedding locations may correspond to an M-ary symbol in a vector quantization scheme. For example, the block in FIG. 10 has five embedding locations labeled Q. The characteristics of these five embedding locations can be adjusted such that they fall into one of M different bin sets, each bin set corresponding to a particular M-ary symbol. Further, the auxiliary data symbols are preferably error correction encoded prior to embedding into the host signal. The result of the quantization based embedding operation is a marked signal (160).

The marked signal passes through a channel for a particular application, and ultimately arrives at a compatible reader. This channel is expected to have some types of distortion that increase the difficulty of accurately recovering the embedded auxiliary data.

Figure 11:
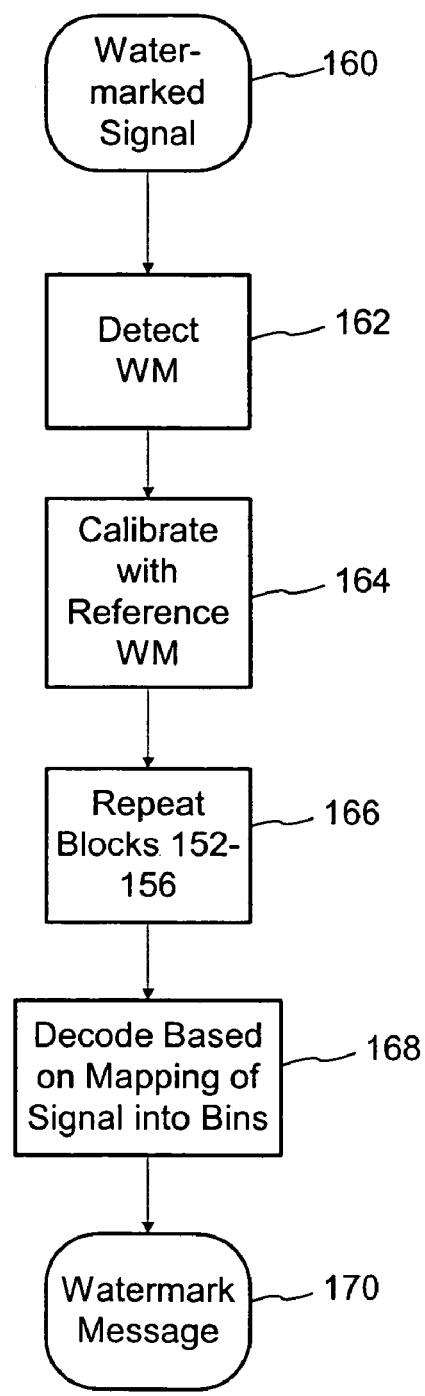
FIG. 11 illustrates a flow diagram of a hidden data reader compatible with the embedder of FIG. 9.

FIG. 11 illustrates a flow diagram of a reader compatible with the embedder of FIG. 9. The reader takes as input a watermarked signal 160. It then executes procedures to detect, calibrate and extract the hidden auxiliary data. First, the reader detects whether a digital watermark is present (162). This may be accomplished by detecting the presence of a detection watermark as noted above. Preferably this detection watermark is robust to distortions expected in the channel. For example, for image signal applications, the robust watermark is preferably robust to rotation and scale. One form of detection watermark is a hidden signal embedded in the Fourier Mellin domain, which is invariant to rotation and scale changes. This attribute enables the reader to identify the presence of a digital watermark. The detection watermark may be a separate watermark, or a watermark signal integrated with another watermark.

Having detected the presence of the digital watermark, the reader proceeds to calibrate the signal (164). In this calibration process, the reader uses attributes of the watermark signal (e.g., known signal components) to determine the origin and coordinate system of the watermark signal. This process is sometimes referred to as calibration or synchronization of the watermark, and may be performed with a reference, calibration, or synchronization watermark signal. This process enables the reader to identify the reference and embedding locations used in the quantization based embedding process. A separate watermark, such as the detection, reference, synchronization, or a calibration watermark, may be used to determine the origin and coordinate system. For images and video, the calibration process determines the translation, scale, rotation, and differential scale of the host signal relative to its original state at embedding using known attributes of the watermark signal to align the data in the received signal. For audio, the calibration process identifies the translation and time scaling. For some distortion channels, certain types of geometric distortion are not likely, so the calibration process can be simplified to merely finding the origin and/or geometric or temporal scaling. For example, rotation may not occur in certain video and audio applications. Thus, the watermark need not be robust to rotation distortion.

There are a number of ways to perform the calibration function. One such approach is to use the elliptical curve fitting method described in this document. Another is to perform correlation detection with peaks of the watermark signal in the Fourier Mellin domain (or other domain, such as the Fourier domain, autocorrelation domain, etc.) to get rotation and scaling parameters, and then perform additional correlation to get translation parameters (e.g., the origin of a watermarked block). Such techniques are described in U.S. Pat. Nos. 6,122,403, and 6,614,914, which are incorporated by reference.

Once the geometric distortion parameters are computed, the reader can align the received signal and evaluate the embedding locations in the aligned signal of the quantization based watermark.

Next, the reader repeats the processes performed in blocks 152-156 of the embedder to segment the aligned signal, compute the local statistics of each segment (e.g., optionally on the reference locations in the particular domain of quantization based embedding), and determine the quantization bin parameters (166). The reader then decodes the quantization based watermark signal by mapping the signal characteristics at the embedding locations into the re-computed quantization bins (168). The bins each correspond to one M-ary or binary symbol. Thus, by mapping the signal characteristics into the bins (e.g., applying the quantization function to the signal characteristic), the reader determines the symbol for each embedding location.

These symbols may have been error correction encoded, in which case, they are supplied to an error correction decoder to extract the hidden auxiliary data message.

One potential drawback for some quantization-based digital watermark embedding schemes is that they are not robust to gain or bias distortions. In other words, if a gain is applied to the watermarked signal, or if a bias signal is added to it, the signal characteristics that have been quantized to hide auxiliary data symbols may be altered such that they no longer correspond to the correct data symbols. By adapting the quantization function in this manner, the quantization-based digital watermark may be made more robust. Further, since the bin structure varies with the host image, it enables data to be hidden more securely.

Quantization Based Watermarks Combined With Other Watermarks

The quantization based embedding and reading method described above enables a number of possible applications. It may be used to embed information separate from another watermark in the same host media signal. One example is sync or calibration watermark described previously. The other digital watermark or watermarks may be embedded and extracted using techniques like direct sequence or frequency hopping spread spectrum.

Attributes of a first watermark embedded into the host media signal may be used to determine the quantization bins used to embed a second digital watermark. For example, a calibration signal comprised of signal peaks in the autocorrelation or Fourier magnitude domain may be used as a component of the first watermark. This watermark is perceptually adapted to the host signal based on its signal activity, variance, or local contrast, where greater signal activity yields more intensity in the first watermark signal. The statistics of this first watermark over a specified local region, such as its root means square, can be used to set the quantization bin sizes for the quantization based watermark embedded in a second watermark in that local region. As the RMS of the first watermark increases, so does the bin size of the quantization based watermark and its robustness.

Another type of digital watermark is one that is generated by spreading a message over pseudorandom number carrier sequence and adding the resulting signal to the host media signal with or without adapting it based on human perceptibility models. Such watermarks may be detected using correlation based detection techniques, where the received signal is correlated with the carrier sequence. The addition of such a watermark before embedding using the quantization based approach adds variability to the host signal, enabling the quantization based hidden data to be embedded more robustly.

Additional types of digital watermarks that may be embedded along with the quantization-based watermark are disclosed in assignee's U.S. Pat. No. 6,122,403 and other literature. Such digital watermark signals may carry a key to extract the quantization-based watermark. For example, the key may specify the embedding locations, the signal characteristics that have been quantized to encode hidden data, or the general form of the quantization function (the local statistics can then be used to identify the quantization bins within that general form with more particularity).

The quantization-based approach may be used for steganographic or data hiding applications, where the objective is to hide larger amounts of information. A first digital watermark is embedded using, for example, spread spectrum techniques and correlation based detection to increase robustness. This robust watermark carries a small payload, or no payload, and performs the function of a detection and/or calibration watermark signal. The quantization watermark carries additional data and provides a higher capacity hidden data channel for auxiliary information within the host media signal (e.g., video, still image or audio).

Another application for dual watermarks, including quantization based watermarks and other non-quantization watermarks is "metrology." Metrology refers to the science of measurement. In the context of the digital watermark, it refers to measurements of the digital watermark in a distorted host media signal to analyze the channel through which the host media signal has passed. These measurements can be used to specifically identify types of distortions or alterations to the host signal due to the channel to authenticate the signal or otherwise characterize the channel.

One authentication application for watermarked objects, such as value documents and identification cards, is to detect whether the object is a copy or an original based on the watermark measurements.

One specific framework for characterizing the channel distortion is as follows. The above quantization based watermark is used to embed a hidden message, which has been error correction encoded (e.g., using convolution codes or some other scheme like turbo or Reed Solomon codes). A programmatic watermark decoder function operates on the host signal after it has passed through a distortion channel (or model of that channel) and extracts raw, error correction coded messages by mapping characteristics to quantization bins. The decoder then reconstructs the original message by performing error correction decoding. It then reconstructs the original raw message symbols by performing a message coding on the extracted message. This message need not be fixed; it can and preferably does carry variable data payloads. Once the raw message symbols are reconstructed, the decoder computes error statistics by comparing the reconstructed raw message symbols with the ones identified by mapping the received signal characteristics to the quantization bins. When the detected raw symbol differs with the reconstructed symbol, it is identified as an error.

Error statistics may be maintained per bin, per region, and/or per signal characteristic. A training set of host media signals (such as images used on a secure document) can be used to characterize errors due to distortion channels. Based on this training set, the implementer can create a classifier that classifies distortion types (like scanning and printing or photocopying) based on the observed error statistics from the training set. The classifier can then be deployed in a programmatic authenticator that measures error statistics of the quantization based watermark signal and classifies the type of distortion (e.g., differentiates an original from a copy or multiple classes of copies).

A similar approach can be used to characterize a distortion channel and measure error statistics that provide a measure of quality of service, such as quality of service of network video or audio broadcasts.

One way to refine the sensitivity of the quantization-based watermark to certain forms of distortion is to adjust the bin sizes over the space of the signal characteristics being quantized so that they are more likely to generate raw symbol errors in particular bins in response to specific forms of distortion being detected. When a high number of errors are observed in those bins, then the resulting error measurement is an indicator of a particular type of distortion known to be associated with that error measurement.

In some applications, it is useful to embed a hash of the host signal in the digital watermark. The above quantization approach can be used to embed the hash of the host signal into the host signal. A robust hash refers to a hash that is not altered due to the embedding of the hash in the host media signal. In other words, the robust hash of the media signal is the same before and after embedding of the hash. Typically, the robust hash is derived from perceptually relevant features. To detect alteration of the host signal, the robust hash is extracted and compared with a newly computed hash of the received signal from which it is extracted. If these two hashes do not match, an alteration has occurred.

Quantization-Based Data Embedding in Mapped Data

The paper attached as Appendix A to Provisional Application 60/435,401, entitled "New Wrinkle in Dirty Paper Techniques," describes methods and systems for quantization based data embedding and reading. The embedder maps a host signal from a first domain into a mapped signal in a second domain that is robust to a class of amplitude modifications that are order preserving. The embedder performs quantization based embedding of auxiliary data into the host signal using quantization bins derived from the second domain that are robust to the amplitude modifications. The mapping improves the robustness of the data embedding method by increasing the chances that the embedded data can be recovered by an auxiliary data reader after amplitude modifications.

A related embedding method projects the mapped signal unto a vector, and specifically, a pseudorandom vector. It performs quantization based embedding on the projected signal. The use of this projection provides added robustness of the embedded data to noise and other forms of distortion.

The recent publications that focus upon watermarking with side information at the embedder emphasize the fact that this side information can be used to improve practical capacity. Many of the proposed algorithms use quantization to carry out the embedding process. Although both powerful and simple, recovering the original quantization levels, and hence the embedded data, can be difficult if the watermarked host signal amplitude is modified. In this section, we present a method that employs a quantization-based technique, and improves robustness by first applying a projection to the host signal data that is invariant to a class of amplitude modifications that can be described as order preserving. Watermark reading and embedding is done with respect to the projected data rather than the original. Uniform quantization of the projected data generally leads to non-uniform quantization of the original data, which in turn can cause greater susceptibility to additive noise. We describe a strategy that results in an effective compromise between invariance to amplitude modification and noise susceptibility.

In this section, we propose a modification to quantization-based techniques to make them invariant to a large class of amplitude modifications; those that are order preserving. In our development, we find that the proposed modification has interesting side effects. Specifically, there are inherent problems that make both embedding distortion and robustness to additive noise image dependent. We make further modifications in order to make our technique more practical. We fully describe our proposed modification to quantization based schemes, ending with an illustration of some undesirable effects. We then develop a method that relaxes the inherent order preserving quantization bin structures in order to make them resemble more closely those found in uniform lattice codes. The modification results in a loss of knowledge of the exact structure of the lattice code, but this structure is recoverable through the use of training data. We then cover several additional considerations that come into play when using order preserving lattice codes. We then describe an extension of our technique to lattice codes applied on pseudo-random projections.

We explore a technique that uses lattice codes on a mapping of image pixels rather than the pixels themselves. The mapping has the property that certain common image modifications will result in the same set of mapped values, which for data-hiding purposes, will lead to a set of invariances. The types of image modifications to which our scheme is invariant can be classified as those that preserve order.

Beginning with a grayscale image, $I(x,y)$, consider its histogram, $h(b)$, where b represents a range of luminance from 0 to Lmax. We are interested in the empirical cumulative distribution function (CDF) of $I(x,y)$, which can be obtained from the histogram:

$$F_b(B) = \frac{\sum_{i=1}^{B} h_i}{\sum_{i=1}^{L_{max}} h_i} \quad (1)$$

Figure 12:
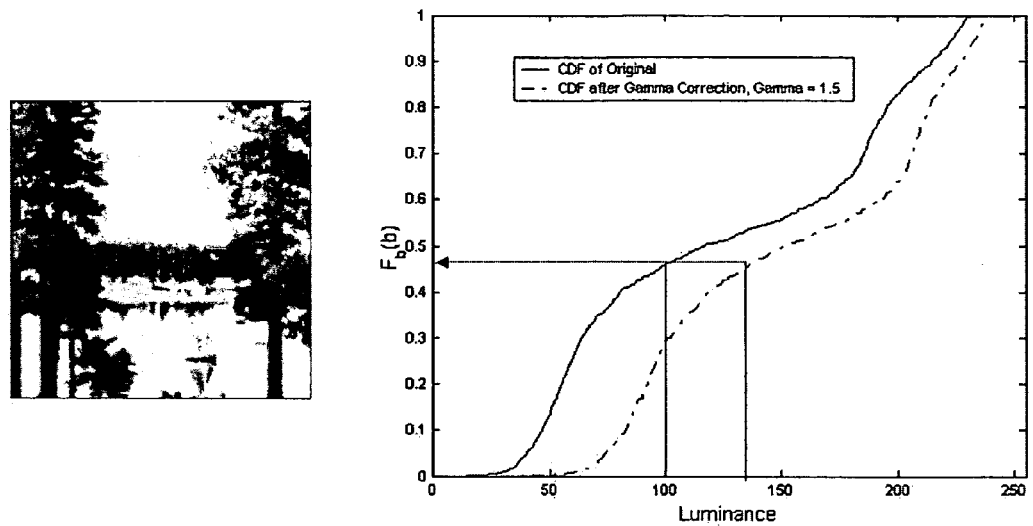
FIG. 12 illustrates an example host image signal and a mapping of the image into a domain used to compute quantization bins for quantization based embedding.

For some luminance value $B=b$, $F_b(b)$ is the percent of luminance values in the image less than or equal to b. This terminology has been derived from language used when referring to real cumulative distribution functions, where $F_x(x)$ is the probability that the random variable X is less than or equal to x. For our purposes, $F_b(b)$ is the mapping we apply to the image pixels prior to data hiding by quantization. In FIG. 12, we have plotted the CDF of the example image "sailboats" (shown on the left side of FIG. 12) using the solid curve.

The plot in FIG. 12 shows the CDF of the image before (solid curve) and after (dotted curve) gamma correction of 1.5. The plot illustrates the fact that x and $g(x)$—the point x after gamma correction—have the same CDF value.

A luminance value of 100 corresponds to an $F(b)$ value of approximately 0.46, as shown by projection onto the y-axis. The dotted curve shows the CDF of the image after a gamma correction of gamma equal to 1.5 has been applied. After the modification, luminance values of 100 become luminance values of approximately 137. It is observed by projection that the new luminance values have the same $F(b)$ values as the old luminance values. In other words, the projection is invariant to gamma correction. More generally, the projection is invariant if the following condition is met:

$$F_y(g(x)) = F_x(x) \quad (2)$$

if $$\frac{d}{dx}g(x) > 0 : \forall x$$

Equation 2 describes the fact that the mapping $y=g(x)$ must be a monotonically increasing function, which means that in its application the ordering of elements remains the same. In addition to gamma correction, several other common image modifications satisfy this condition for example alterations involving brightness or contrast. In our proposed data-hiding scheme, we quantize each mapped value, $F_b\{b(x,y)\}$, using a quantizer that is appropriate for the message that we wish to embed at location x,y. In a binary messaging scheme we use two uniform quantizers that are offset from each other, or dithered. The result is a scalar lattice code applied to the mapped data, $F_b\{b(x,y)\}$, rather than the luminance values, $b(x,y)$. Another way to view this process is to consider what happens to the luminance values when we quantize with respect to the mapped data. There is an equivalent set of quantization levels in the unmapped luminance domain given by:

$$b_q = F_b^{-1}(P_q) \quad (3)$$

In the above equation, the $P_q$ represents the quantization levels of the projection $F_b(b)$. The $b_q$ are not uniform unless the image content has a flat histogram (linear CDF). In general, the bins $b_q$ will be close together where the CDF has steeper slope and further apart in regions of gradual slope. We show an illustration of this in FIG. 13.

Figure 13:
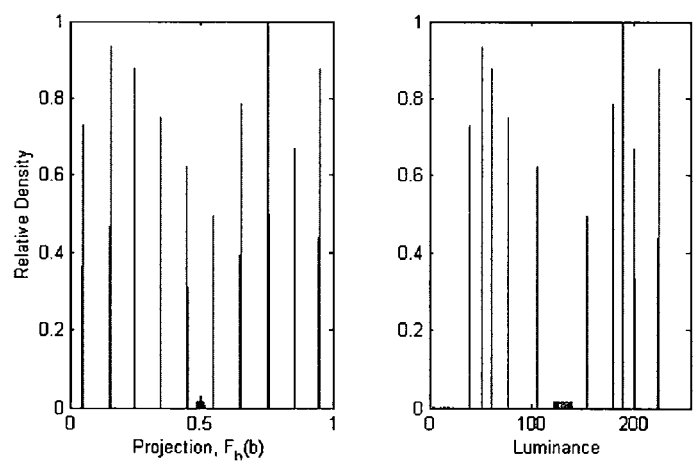
FIG. 13 illustrates histograms of a host image signal after a projection into a domain and after embedding with auxiliary data using quantization based embedding.

FIG. 13 illustrates two histogram subplots: the right subplot shows histogram of image after embedding; the left subplot is histogram after mapping $F(x)$ has been applied.

The subplot on the left in FIG. 13 shows the distribution of projection values after quantization when the quantizer for embedding a bit value of '1' is used for all pixels. The quantization levels are uniform; they begin at $F_b(b)=0.05$ and continue with a step-size of 0.1. They are set coarsely for demonstration purposes. We use the same "sailboats" image in this example as we used in FIG. 12. The dependency upon the CDF of the corresponding quantization levels in the luminance domain is depicted in the subplot on the right. The quantization levels are narrowly spaced in regions where the CDF increases most rapidly (luminance of around 50 and 200). Conversely, the quantization levels are more spread out in CDF regions of small slope.

There are several drawbacks with the proposed approach if it is implemented without further modifications. Once again referring to FIG. 13, we see that the required embedding distortion for regions where the quantization bins are widely spaced can be quite large. There are some visible artifacts in the figure at luminance values close to zero and around one hundred twenty, in that they do not belong to a peak. For our example implementation, we set a maximum on the allowed magnitude change of luminance. If the change required for quantization is too large, we simply do not alter the pixel in question. Hence, the previously mentioned artifacts are the result of not performing the quantization operation in cases where the resulting embedding distortion would be impermissible. Of course, one can reduce the effect of this particular problem by decreasing the bin step-size in the mapped domain. However, this exacerbates the effect of another problem. In areas where the image CDF is increasing rapidly, the quantization bins in the luminance domain will be close together, which leads to poor noise immunity. In other words, it will take very little distortion to cause an error in these regions. A related problem has to do with the overall span of luminance values in an image. For a fixed number of levels in the projection domain, there will be poor noise immunity if the overall luminance span is small. Conversely, there will be data embedding problems if the luminance span is too large. Next, we describe a modification to the proposed algorithm that mitigates these problems.

Adaptive CDF Lattice Codes

As discussed above, the spacing of quantization bins in the luminance domain when uniform in the mapped domain will sometimes lead to unsatisfactory behavior. Ideally, one would alter the location of these bins by considering the image CDF. In the extreme, one would let the CDF dictate bin assignments in such a way that the result would be uniform bin spacing in the luminance domain, a typical lattice code structure. In doing so, we would remain invariant to luminance shifts due to the fact that the bin starting locations would be governed by the projection $F_b(b)$. Of course, we would lose invariance to other types of amplitude modifications. We seek a means to go between the two extremes.

One solution to the aforementioned problem adapts bin spacing from a uniform projection domain starting point in a step-wise fashion. We do this so that the bin spacings are amenable to easy recovery should the watermarked signal be subjected to a variety of amplitude modifications. Initial quantization levels in the projection domain are chosen at a finely granulated level. The spacing is chosen so that required luminance changes will not be too large in CDF regions of small slope.

The next step is to apply a process of quantization level coarsening. The goal of this process is to remove some quantization levels in regions where they are too close together. Ideally, we should achieve an overall bin configuration that is much more uniform. We treat the set of two quantizers, representing different message bits, together so that the dithering configuration remains intact. By dithering, we mean the consistent alteration of symbols 'circle' and 'square' representing symbols '0' and '1', respectively. Beginning with the lowest two quantization bins in each quantizer, we consider the additional embedding distortion that would arise if we removed half of the levels. We refer to this as pruning. We will describe shortly the mechanism used for pruning. If the additional embedding distortion is deemed satisfactory, we perform the pruning. We proceed in an analogous fashion throughout the entire range of quantization bins. An illustration of the described process is shown in FIG. 14.

Figure 14:
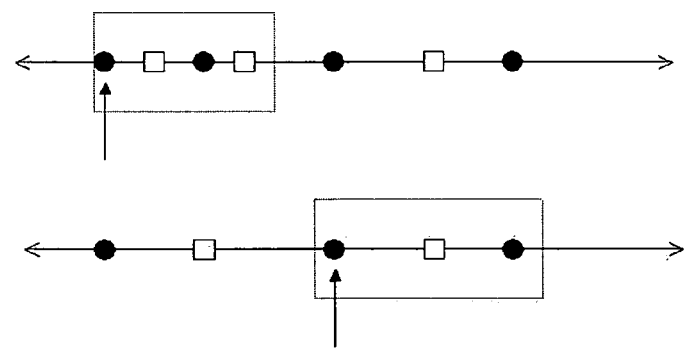
FIG. 14 is a diagram illustrating a quantization level adjustment procedure to make quantization bins more uniform after deriving the bins from a projection domain.

FIG. 14 is a diagram illustrating a quantization level coarsening procedure in the luminance domain where the quantization centroids are generally non-uniform.

The quantizer is represented in the luminance domain where the levels are in general non-uniform. The vertical arrow in the top subfigure points to the first member of the group under consideration for pruning—encapsulated by the dotted lines. In order to prune the group, we would like to replace the set of four quantization levels in the group with a single pair of quantization levels. This is done by leaving the first quantization level unchanged, removing the $2^{nd}$ and $4^{th}$ levels, and changing the identity of the third from a circle to a square. Next, we determine the additional embedding distortion that is required to adopt this new quantizer configuration. If, for example, the maximum embedding distortion remains below a threshold after the modification, we keep the new configuration. Otherwise, we do not make the change. In the second subfigure we have the result of the described alteration when it is deemed distortion satisfactory. The dithering pattern remains intact and the change affects only local positions within the quantizer. As mentioned previously, we then proceed to the next group of four levels, which is indicated by the vertical arrow pointing to the first member of the new group in the second subfigure. Whether pruning takes place or not, the next group that we consider begins with the symbol two symbols to the right of the first symbol in the previous group. Therefore, if for the case of the example just described we had not carried out the pruning process, the next group would begin with the second circle from left in the first subfigure of FIG. 14.

Figure 15:
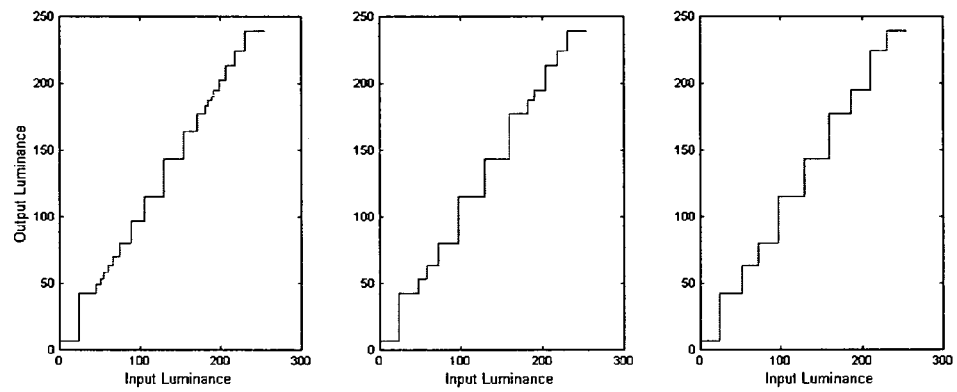
FIG. 15 is a diagram illustrating the effect of adjusting quantization levels derived from a projection domain of a host signal.

After pruning, the quantization levels in the luminance domain should be of both a more appropriate spacing throughout and appear more uniform. We can, of course, perform subsequent iterations of pruning as necessary. We have provided an example of the result of two iterations of the described process in FIG. 15. We have applied our algorithm to the "sailboats" image. Beginning with uniform quantization levels in the projection domain, the quantization levels for one of the quantizers in the luminance domain are shown in the leftmost subplot in FIG. 15. The initial quantization levels are disparate, to say the least. Referring to the second subplot, which is the result after one iteration of coarsening, we see a substantial improvement. After two, the quantization levels are much closer to uniform (furthest right subplot of FIG. 15).

Quantization Level Recovery

The benefit of uniform quantization in the projection domain is invariance to amplitude modifications that preserve luminance ordering. By pruning quantization levels using the process described above, we lose a priori knowledge of what the exact quantization levels are if the image amplitude is modified. However, these original levels are not difficult to recover for two reasons. Qualitatively speaking, many amplitude modifications of the type we are concerned with will not drastically modify the shape of the image CDF. We expect that neighboring regions in the luminance domain will be affected in more or less the same way. Therefore, since it operates locally, the process of pruning initial quantization levels in the modified image should result in close to the same set of final levels that were arrived upon with respect to the initial image. The other reason we can recover the initial levels is a result of the coarsening design itself.

Recovering the initial quantization levels can be construed as a hypothesis-testing problem. Suppose we are presented with a watermarked image that may have been altered by a process that preserves pixel ordering, such as contrast adjustment. The first step in watermark reading, as well as embedding, is to create the image CDF. From this point, we establish the initial set of relatively finely granulated levels that are uniform in the mapped domain. It should be stressed that the reader and the embedder use the same initial spacing of levels in this domain. Here, the reader is asked to behave as if it were the embedder. The reader conjectures as to whether the embedder pruned quantization bins in the original image prior to embedding, keeping in mind that the quantization bins in the luminance domain may have moved somewhat relative to their embedding positions. Again, the procedure is carried out beginning with the lowest quantization levels in groups of four. Assume for a moment that we allow only one stage of coarsening. For each group, there are two possible scenarios. Either, we left the four levels alone, or we merged them. In many instances, one of the two scenarios will be remote and we need not consider it further. However, in many other cases it will be difficult to establish which case is valid without the use of training data.

Figure 16:
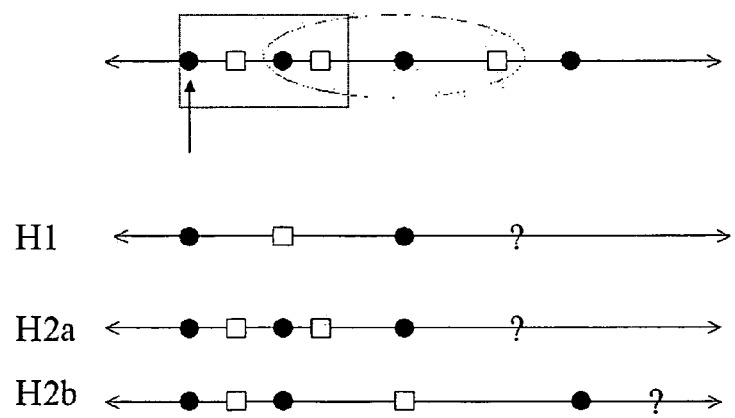
FIG. 16 is a diagram illustrating a quantization level recovery process used in digital watermark decoding.

FIG. 16 is a diagram illustrating a quantization level recovery process. The top subfigure is the same one that was used in FIG. 14 with one modification. We have drawn a dotted ellipse around an additional group to show how it contributes to the decision process. The next subfigure, labeled H1, is the configuration after coarsening occurs. The question mark to the right of the depicted quantization levels is present to indicate that any additional quantization levels in the quantizer have no bearing on the decision at hand The last two subfigures represent the case where we do not perform coarsening on the first group. The two competing hypotheses here consist of whether coarsening on the next group occurs, which is circumscribed by the ellipse in the top subfigure. The quantizer H1 differs from both H2a and H2b, which both have the bin pattern circle, square, circle over the same range that H1 has the pattern circle, square. Training data could be used to make a decision between whether H1 is in force versus H2 in considering only the mentioned set of levels. Training data, in this case, is a pre-specified subset of the total data to be embedded where each symbol is known. As such, it would be embedded using the same set of quantizers as the regular information-carrying data. There are at least several ways to use the training data in order to recover the proper quantization bin configuration. One such method is comprised of decoding any training data that happens to belong to the region spanned by the first group of bins using each of the hypothesized bin configurations. In doing so, we can determine the most likely quantizer configuration by measuring the resulting error rate. Moreover, by considering training data from additional levels (up to the second circle in H1) we could further bolster our decision. Supposing for a moment that H1 is representative of what actually occurred at the embedder, it is apparent that H2a is much closer to the true configuration than H2b. It is therefore much more likely that H2a will be chosen in the event of an error than H2b. As with embedding, the described process continues over the range of the quantizer.

There are a couple of considerations that will slightly modify the process just described. One of these is the fact that we will often like to perform an additional iteration of coarsening to our quantization levels. Doing so will grow the number of hypotheses we must consider in each region of the quantizer. Another issue lies in the fact that we can use a priori information in the coarsening process in addition to training data. Earlier we stated that we need not consider hypotheses that are too remote. Rather than making a binary decision in this regard we can incorporate our estimate of the prior probability for each hypothesis into the overall decision resulting in an a posteriori determination.

Other Considerations

Luminance Span Accommodations

Some images are inherently unsuited to data embedding using the described algorithm. As a severe example, take an image that spans just a few gray levels of total contrast. The CDF of this image changes very quickly from zero to one, yet our procedure begins with a prescribed set of projection domain quantization levels. The coarsening method described above will partially serve to alleviate this problem, but it will take many iterations of the procedure in order to whittle away the number of quantization levels to the scant few that appropriately match the image content.

Figure 17:
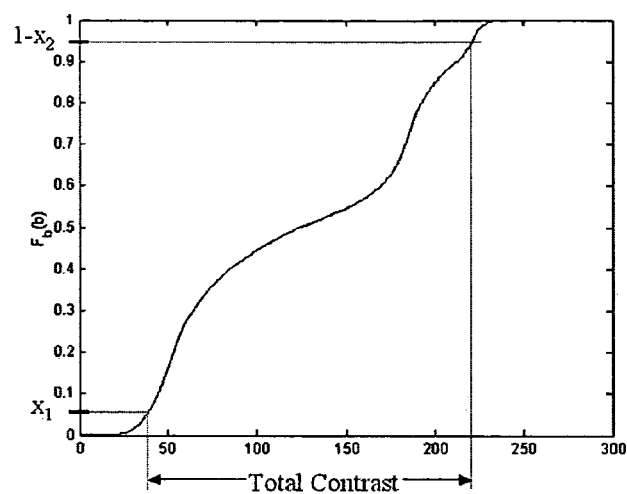
FIG. 17 is a diagram illustrating total contrast definition used in assigning quantization levels in a projection domain.

A further enhancement to our basic algorithm involves assessing the total contrast range prior to assigning initial quantization levels in the projection domain. One way to define this concept is in terms of the image CDF. We define the total contrast as the difference in luminance between the corresponding points in luminance where the CDF is equal to $x_1$ and where the CDF is equal to $1-x_2$, where $x_1$ and $x_2$ are small and typically $x_1=x_2$. The foregoing description applied to the image "sailboats" is illustrated in FIG. 17. From our measure of total contrast, we assign an initial spacing of quantization levels in the projection domain. In order to make the problem tractable, we would prefer that the same set of initial quantization levels are chosen during watermark reading as was used for watermark embedding even if a fairly significant amplitude modification has taken place. Suppose, for example, we consider only two cases. We will begin with many quantization levels for embedding when an image has large total contrast, and we will use relatively few quantization levels when the image has small total contrast. If the wrong set of initial quantization levels is chosen when reading the watermark, we can use the training data to rectify the problem.

FIG. 17 is a diagram illustrating total contrast definition.

Distortion Compensation

Distortion compensation has interesting implications when applied to our basic method. Recall from the work of Chen and Wornell that when applied to any given element, distortion compensation results in a weighted combination of that element before and after quantization. The weighting parameter, which we refer to as alpha, has a range between zero and one, where a zero value means that no image alteration is performed and a one means that full quantization is used. In a uniform quantizer decreasing alpha increases bin sizes, which reduces the overall probability of error in more severe additive noise environments. Due to the fact that we have, in general, non-uniform quantizers, we can treat distortion compensation in a different way. Put simply, we choose to make the amount of distortion compensation used commensurate with the size of each bin. Where the bins are close together we use no distortion compensation, set alpha equal to one (we could use a default maximum value for alpha instead of one). Where the bins are spread further apart, we decrease alpha accordingly. By adding this additional feature, we mitigate artifacts, as we have called them, as a result of not embedding due to the large bin spacing.

Contouring Reduction

A random or pseudorandom key can be used to scramble auxiliary data before embedding it in the host signal. Visually, their addition has the effect of removing the contouring that would otherwise be a result of the quantization process. We refer to contouring as the visual effect that is achieved when a relatively small number of the total possible gray levels are populated by pixels. In brief, the key is used to partition the image pixels into possibly many different groups. The pixels within each group use a quantizer that is offset from the original quantizer by some fraction of the bin size. Each group uses a different fractional offset. As a set they are typically equal-spaced between 0 and 1. Provided enough distinct groups are used there should be no observed quantization upon embedding, especially when distortion compensation is used.

In our proposed method, we can employ the key to similar effect. However, there is some ambiguity in terms of how we proceed because our quantizers are in general non-uniform. We define quantizer offsets in the projection domain and maintain the assumption that, for each group, the fractional offset is between zero and one. To adjust a fractional offset from the original quantizer configuration, we move each bin center the desired fractional amount to the higher of the two adjacent bin centers. One potential issue with this approach is that the coarsening procedure applied to generate the original quantizer configuration may not match the quantizer for a group with a relatively large fractional offset. For this reason it may be better to define an offset range centered about the original quantizer with fractional shifts in either direction.

Training Data

There are potentially two places where training data is required. We have already mentioned that training data is used to determine how quantization levels are configured prior to reading the watermark. Another possible area of use involves a reference for the original CDF, itself. Through the process of watermark embedding it is possible that the original CDF will be altered. If, for example, quantization without distortion compensation and a security key is used during embedding, the CDF will change to resemble a staircase. When the underlying CDF is altered, we must reserve a subset of the image pixels to use as unembedded reference values. It is the CDF of the reference values rather than that of the total image that is used to govern quantization bin assignments. In implementations that use fractional offset, key-controlled quantizers and/or distortion compensation, the reference set is potentially unnecessary because the original CDF is altered insignificantly during the embedding process.

Order Preserverving Spread Transform Lattice Codes

To round out our discussion of lattice codes applied to image data that has undergone the mapping F(b), we discuss the implications of extending our ideas to the case where quantization occurs after the data has been projected onto a pseudo-random vector. A general description of the process is as follows. We partition the image into vectors of length L, comprised of pixels from pseudo-random locations throughout the image. Focusing on just one of the resulting vectors, we apply the mapping function, $F(b_i)$, to each element of the vector. To establish the required watermark, we project this new mapped vector onto a pseudo random sequence. The result is quantized using one of two uniform quantizers, depending upon which message we want to embed. The watermark is embedded such that the spread transform of the mapped data achieves the quantization target. Mathematically, this can be expressed as follows:

$$\sum_i F(b_i + w_i)s_i = P_Q \quad (4)$$

In this equation, $s_i$ is the pseudo-random spreading vector and PQ is the target projection. The equation expresses the fact that the watermark, $w_i$, is added to the original luminance data. Another way to view this expression more explicitly shows how the watermark is generated to achieve the desired result:

$$\sum_i [F(b_i) + d_i]s_i = P_Q \quad (5)$$

In the above equation, the projection of each component of the original data is modified additively, which matches the procedure applied when using regular spread transform lattice codes. The relation between the two expressions is:

$$w_i = F^{-1}(F(b_i) + d_i) - b_i \quad (6)$$

Depending upon the image histogram, this may lead to too much embedding distortion for some of the $b_i$.

A graphical illustration of some of the key issues associated with the described process is shown below.

Figure 18:
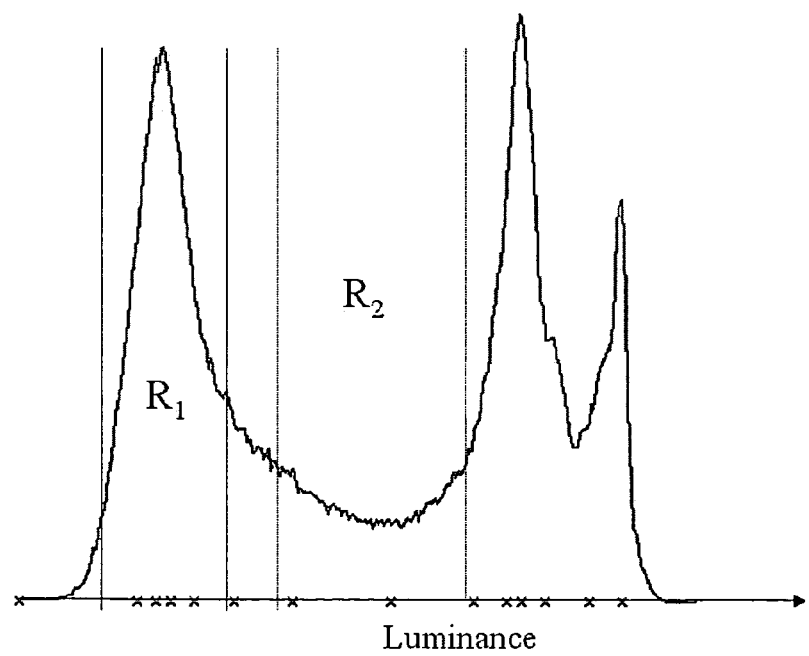
FIG. 18 is a diagram illustrating a histogram of an example image before watermark embedding.

FIG. 18 shows a histogram of image "sailboats." The area under the curve is constant between any consecutive pair of x's.

This figure is the histogram of the image "sailboats" before embedding. There are a series of 'x' marks on the axis labeled 'luminance'. These 'x' marks are uniformly spaced in the projection F(b), but they are clearly not uniformly spaced with respect to the image luminance data. For the purpose of embedding using the spread transform process described above, we pseudo-randomly draw L pixels that are distributed according to the histogram. Some such pixels will be drawn from the region labeled, R2. It is observed that in this region we must make relatively large changes in luminance in order to alter the corresponding projection value. Referring again to equation 5, we see that there are many ways to choose each of the $d_i$. Typically, the parameter is made constant for simplicity, but in this situation we may want to make $d_i$ small for image pixels drawn from $R_2$. Of course, we will have to compensate by making $d_i$ larger in regions like $R_1$, where the projection values change much more quickly.

As with the scalar implementation, the quantized projection version of our scheme is more sensitive to additive noise in some regions of luminance than others. In region $R_1$, the F(b) value will change quickly with small amounts of additive noise. The same amount of noise is seen to have little effect in region $R_2$. By equalizing the various regions with respect to additive noise, we expect to achieve better results. Equalization is accomplished through weighted projections.

$$\sum_i a_i[F(b_i) + d_i]s_i = P_{Q,W} \quad (7)$$

We have modified equation 5 so that each component is weighted by $a_i$, which depends upon the region that contains each $b_i$. For example, we propose to use smaller weights for a region like $R_1$ and larger weights for those with characteristics like $R_2$. If we have chosen the weights properly, the weighted projection, $P_{Q,W}$, will change fairly evenly for equal luminance changes across different regions of the image. Also, observe that for a proper choice of weights, it becomes less of a problem to make $d_i$ in equation 7 constant for all i. It is worth pointing out at this time that the embedder and reader should use the same set of weights. Otherwise, the effective noise produced by using the wrong set of weights will undermine their use altogether.

Figure 19:
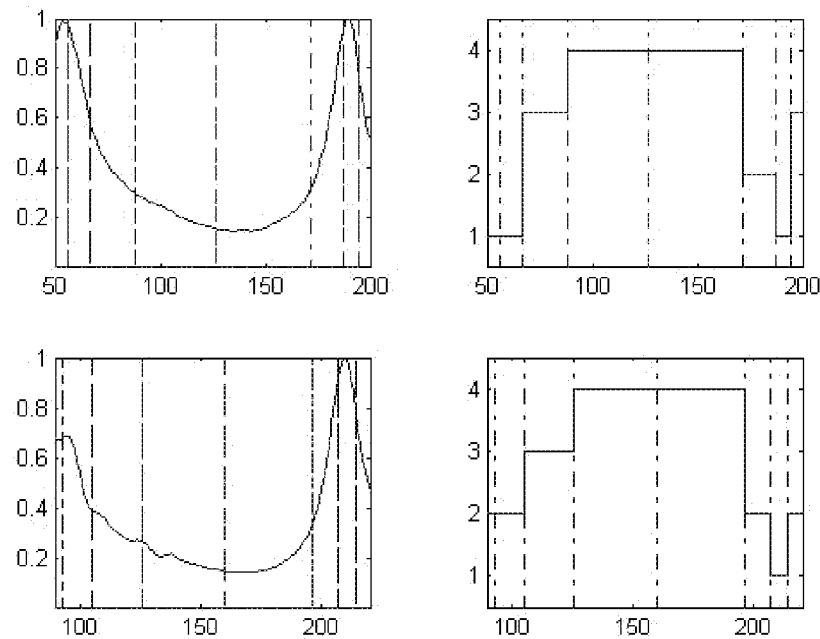
FIG. 19 is a diagram illustrating aspects of a process for determining projection weights.

FIG. 19 illustrates a process for determining projection weights. If the weights are to be derived from the data, itself, we find a way to consistently obtain the same weights that were used during embedding when detecting the watermark even if the image is altered in various ways. In the top-left subplot of FIG. 19, we show the histogram of an image within the luminance range of fifty to two hundred. The vertical dotted lines partition the histogram into regions of constant thickness in the projection domain. Based upon our arguments above, we would like to assign a weight to each region that varies inversely with the average density. However, there is some difficulty in accomplishing this task due to the fact that the image may undergo an amplitude modification that changes the character of the histogram. The effect of just such a transformation can be seen in the lower left subplot of the same figure. We have applied a gamma correction of 1.5 to the original image. The two nearly equal histogram peaks in the former subplot are now of markedly different heights. By designing weights that are a smoothly varying function of the image histogram, we are bound to get different results when trying to recover the weights if the amplitude is modified.

The process of determining weights for projections begins by partitioning the projection axis, F(b), into N fixed regions. The regions are of constant thickness in the projection domain. The partitioning is done with respect to the projection because we require that the region boundaries remain constant if an order preserving transformation, y=g (b), is applied to the image luminance. An example of the partitioning applied to the histograms described in the previous paragraph is shown in FIG. 19. To further expedite our process of weight determination, we quantize with respect to the y-axis in addition to the x-axis. The average density in each of the N regions is computed. The region that has the maximum average density is assigned a weight of 1. This weight is the minimum for all regions as it is expected to have the worst noise immunity. The other regions are assigned weights relative to the first weight assignment. An example of this process is depicted in the top-right subplot of FIG. 19. In each region we have quantized the weight to one of four levels, which is observed to vary inversely with the average density. After gamma correction with gamma equal to 1.5, the same process is applied. The weights match the set used for embedding in all but two out of the seven regions shown. However, we can do better.

By using training data we can refine the weight estimates obtained using the process described above. Training data are defined with respect to the quantized projection subspace; one element of the training dataset consists of L components of luminance data. Training data is embedded in exactly the same fashion as the information carrying data, according to equation 7. On the watermark detection side, once an initial estimate of the weights is obtained for each region, we apply the corresponding projections to the training dataset. We call the set of projections our reference set. An error rate can be assigned to the reference set since we know what the training dataset is. Next, we vary the weights in each region both one step up, and one step down. For each weight variation we reapply the projections and compare with the reference set. If fewer errors are obtained, we replace the old weight with the new, and call the new set of projections the reference set. In this way, we proceed through all regions and obtain the correct set of weights.

We have presented a novel modification to watermarks based upon lattice codes that renders them invariant to many types of amplitude modifications. Quantization bins in our scheme are defined with respect to the image CDF, which maps order preserving image transformations to the same location. We have disclosed several ways through which invariance can be retained and distortion problems can be reduced involving the use of training data. Finally, we have extended our ideas to the case where lattice codes are applied to data that has first undergone a spread transform. These methods can be applied to other data types like audio, can be adapted to address other forms of distortions (e.g., additive, multiplicative, geometric transforms, etc.), and can be adapted for other types of projections of signal data, such as frequency domain data and projections of frequency domain data.

Further Enhancements to Lattice Codes

As described previously, quantization based digital watermarking techniques are not robust to systematic changes to the watermarked signal that alters the quantization bin structure. One example of a systematic change that causes problems in lattice codes is amplitude modification, but as noted, there are other modifications as well.

Figure 20:
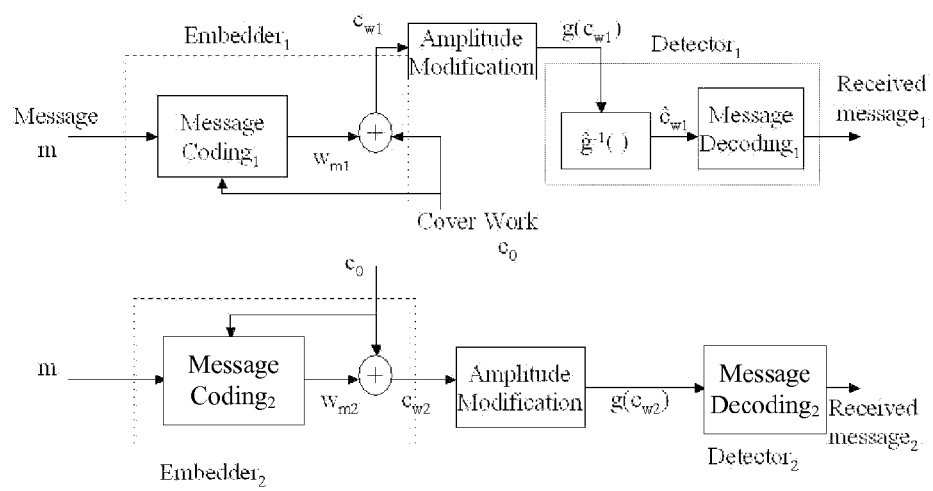
FIG. 20 is a diagram illustrating approaches for recovering from distortion in digital watermark decoding that employ quantization based techniques.

FIG. 20 illustrates two approaches to extend the power of lattice codes to cases where resilience to amplitude modifications is desired. In FIG. 20, both embedders contain a block called "Message Coding," which has two inputs. This illustrates a process that Cox, Miller, and Bloom refer to as "informed coding" because the message encoder explicitly takes into account the cover work when choosing the watermark. After an amplitude modification is applied, the detector in the top block diagram estimates and inverts the modification prior to decoding the watermark message. A system like the one described has been proposed. Conversely, the system in the bottom block makes no explicit attempt to correct the amplitude modification. Instead, it is designed to be invariant to such changes. The message coding and decoding blocks are darkened to emphasize that something special must be done in order to achieve the sought after invariance.

Above, we described a modification to quantization-based techniques to make them invariant to a large class of amplitude modifications; those that are order preserving. However, there are inherent problems that make both embedding distortion and robustness to additive noise image dependent. We make further modifications in order to improve our technique. We describe a method for assigning quantization centroids using a finite state machine. We then address how watermark decoders recover the quantizers (e.g., quantizer bins or levels). In a first such method, we describe how a secondary watermark is used to convey the quantizer structure. The second method utilizes training data and dynamic programming to achieve the same end. We then give further details about one possible implementation, and describe experiments and results.

Adaptive CDF Lattice Codes

As discussed above, the spacing of quantization bins in the luminance domain when uniform in the mapped domain will sometimes lead to unsatisfactory behavior. Ideally, one would alter the location of these bins by considering the image CDF. In the extreme, one would let the CDF dictate bin assignments in such a way that the result would be uniform bin spacing in the luminance domain, a typical lattice code structure. We have devised two methods that adapt bin spacings according to the CDF structure of the cover work. In each method fixed reference points are established in the CDF domain so that the watermark is recoverable when an order preserving amplitude modification is applied. The first of these, which we refer to as quantization bin coarsening is described above.

The second method we have used to assign quantizer spacing can be categorized as a finite state machine approach. Both this and the pruning method attempt to assign quantization bins that are nearly uniform in luminance with an appropriate spacing. Another similarity between this method and the pruning method is that they both treat the two or more distinct quantizers used for embedding different message symbols as a contiguous, dithered, whole. In other words, when we refer to a quantizer configuration, we mean the interleaved set of individual message quantizers. The first bin centroid is a fixed point in the CDF, for example F(x)=0.01. The corresponding centroid value in luminance will be highly image dependent; i.e. in dark images the first bin centroid will be lower than in lighter images. Suppose the first bin centroid assignment in luminance is $q_0$. We would like to assign the next bin centroid to the value $q_1=q_0+b$, where b is the target bin separation. However, if we allow the centroid to be chosen in this fashion, then with respect to the CDF domain the next bin centroid will lie anywhere within the range $0.01<F(q_1) <=1$, depending upon the image content. Instead, we constrain the choice of the next bin to be one of a small set of predefined values with respect to the CDF domain. We write the set of possible assignments for the next bin in the CDF domain as $q^j_{1,CDF}=q_{o,CDF}+t_j$, where j runs from 1 to N. The N $t_j$ represent possible state transitions from $q_0$ to $q_1$. An example set of $t_j$ for N=5 is t={0.01, 0.03, 0.05, 0.07, 0.2}. In order to determine which of the set of possible $q^j_{1,CDF}$ is the best choice for the next bin assignment, we first perform the inverse mapping $q^i_1 = F^{-1}(q^i_{1,CDF})$. We then select the one that is closest to $q_0+b$. Equation 8 mathematically describes the overall progression of quantizer bins in the CDF domain.

$$q^j_{k+1} = q_k + t_{j,k} \quad (8)$$
$$j \in 1 \ldots N_k$$
$$q_{k+1} = \mathrm{argmin}_j(\|F^{-1}(q^j_{k+1}) - (q_{k,Lum}+b)\|)$$

In equation 8 we have included additional subscripts, k, on both N and $t_j$. These are used to represent the general case where the set of possible state transitions to new states depends upon the current state.

Figure 21:
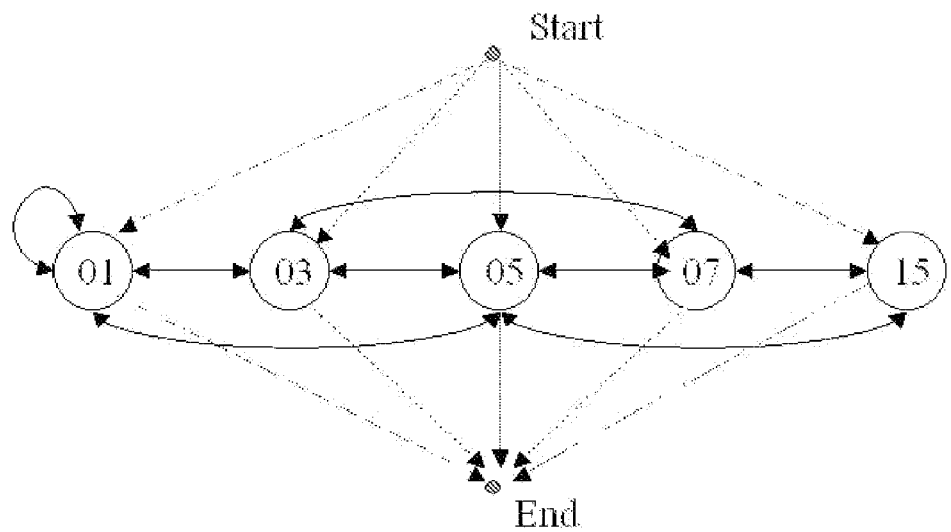
FIG. 21 is a diagram illustrating a finite state machine approach for quantizer assignment.

An illustration of the state transition process described in the previous paragraph is shown in FIG. 21. FIG. 21, in particular, gives an example of a finite state machine approach for quantizer centroid assignment.

In FIG. 21, we have depicted what is known as a finite state machine, so called because it describes a system that operates under a limited number of possible states. Furthermore, when the system changes states its options are constrained. It is not allowed to freely change its state to all of the other possible states in the system. Rather, it is limited to a subset of the total. This behavior is represented by each of the solid double connector arrows in FIG. 21. For example, if the system is in the state '0.01' it is allowed to transition to states '0.03' and '0.05.' It is also allowed to remain in the same state, which is represented by the looping arrow that both begins and ends in state '0.01'. The arrows don't have to be two-way—we might allow transitioning from state '0.01' to '0.05' but not allow the reverse.

The initialization step, which includes determining both the first and second bin centroids, and the termination step, which comprises determining the final centroid, are not captured by the description thus far. Recall that the first centroid is selected according to some small default value of F(x). At this point the system is not in any of the possible states. Graphically, this is illustrated in FIG. 21 with the small circle labeled 'start.' From this non-associative point, the system must transition into a valid state. The dotted arrows that enter each of the states represent that in this case all possible states are allowed. In some implementations we may limit the set of possible initial transitions. For the case of termination, we again refer to equation (8). In that equation we see that each $q_k$ is larger than the previous centroid by at least the size of the smallest state (label) in FIG. 21. Eventually the sequence of $q_k$ will approach 1.0, which is the largest value F(x) can attain. Algorithmically, we must enforce a constraint where any state transition that results in a value of $q_{k+1}$ that is greater than one is not allowed. Termination occurs when in a given state all of the remaining possible state transitions result in the next quantizer centroid being spaced too close to the previous centroid. As the system can be in any of the possible states in FIG. 21 when this occurs, termination is represented by the set of dotted arrows emanating from each of the states and entering the small red circle entitled 'end'.

There is a tradeoff between the ability to attain uniform centroid spacing and minimizing complexity in the system. It would require a very large number of states and state transitions to perfectly achieve the target set of centroid spacings. As we shall see in the next section, such a configuration would either require a large overhead and/or would be difficult to recover. A good strategy is then to limit the finite state machine to a manageable number of states, and settle for some deviation from the target spacings. In areas where the resulting centroids are further apart than desired, one can increase the amount of distortion compensation to limit embedding problems.

Quantization Level Recovery

The benefit of uniform quantization in the projection domain is invariance to amplitude modifications that preserve luminance ordering. By adapting the quantizers to image content using techniques such as those described above, we lose a priori knowledge of what the exact quantization levels are if the image amplitude is modified. However, these original levels can be recovered. Qualitatively speaking, many amplitude modifications will not drastically modify the shape of the image CDF. Secondly, we can embed side information into the image that can help in determining what quantizer configuration was used during embedding.

Exact Recovery Using Secondary Watermark

One possibility for facilitating quantizer recovery uses a secondary watermark to encode a bit string that defines the quantizer configuration. The secondary watermark could be a spatial spread spectrum watermark, or it could be any type that is naturally robust to amplitude modifications. In most scenarios the total number of quantizer centroids that define the overall quantizer configuration will be fairly small—on the order of twenty. Also, at the time of defining the quantizer configuration using the finite state machine method, the number of possible state transitions from any given state will also be small, on the order of four to eight. The entire quantizer configuration can be defined as a sequence of state transitions, which can be represented as a bit string. Suppose we define a worse than typical scenario as one that has thirty quantizers in its configuration. Further suppose that in defining the configuration, every state transition is chosen from a possible eight, each of which has equal apriori probability of selection. The length of the bit string in this case would be ninety (30 quantizers times 3 bits each), which is small compared to the practical payload size of the lattice code.

We should be able to reduce the size of the configuration bit string through source coding. The coding scheme would operate on the principle that not all state transitions are equally likely. For example, if in FIG. 21 the system is in state '0.05', there are four possible state transitions. However, it is likely that the four transitions will not occur with equal probability. By characterizing the state transition probabilities for each of the states, we could use a source coding algorithm like Huffman encoding to reduce the length of the quantizer configuration bit string prior to embedding.

It is worth pointing out that the number of bits describing the quantizer configuration varies from image to image. This means that the secondary watermark is variable in length. For the described system, we offer two ways of dealing with this fact. One way is comprised of pre-pending a header to the configuration bit string, which contains the number of state transitions in the quantizer configuration. An alternative comprises decoding the configuration bit string subject to the constraint that the total sum of state transitions does not exceed one. If we assume that the two watermarks are embedded in spatial locations that do not overlap, the primary watermark would also be of variable length.

Inexact Version of the Foregoing Method Using Prediction

The method of the previous subsection does not utilize the host signal to aid in the quantization level recovery process since the quantization configuration is recovered exactly by decoding the bit string. In this section we briefly describe a method to reduce the length of the bit string needed to encode the quantization configuration at the expense of exact recovery.

In this variation, instead of encoding information for every state transition we encode information that represents the change in F(x) over N state transitions. More specifically, if the configuration is in a given state, S, all permissible sequences of N state transitions are cataloged, resulting in a total of L unique sequences. The sequences are then sorted and reindexed by their total change in F(x). In other words, sequences that have the same change in F(x) receive the same index. The index that results in the change in F(x) that is closest to the target value is encoded.

At the decoder, each of the N individual state transitions are estimated by finding the most likely sequence of state transitions that results in the overall change in F(x) that was encoded. The CDF of the received image is used for this purpose. Generally, we can apply a smoothness constraint to rule out candidates that imply a radical amplitude modification has been applied to the image. Typically, the quantizer configuration will contain multiple groups of N state transitions, depending upon the size of N. An error in one group will not carry-forward to affect the other groups.

Recovery through Structured Search

Figure 22:
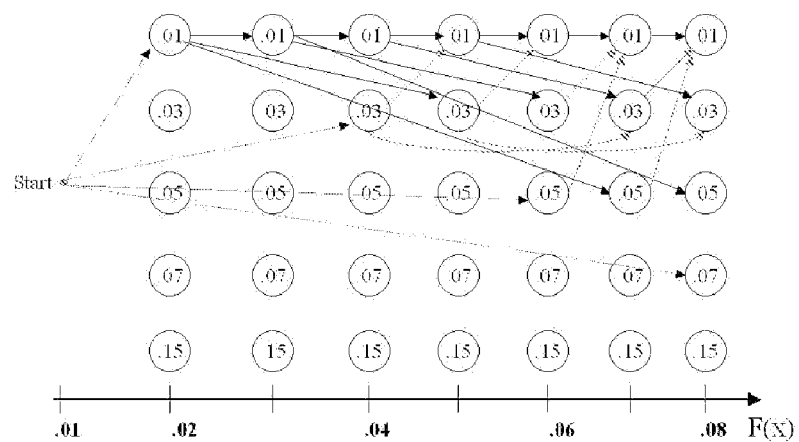
FIG. 22 is a diagram illustrating a dynamic programming approach for recovering quantizer levels.

In FIG. 22 we depict a trellis diagram that shows the unfolding of the state transition process from FIG. 21, over the time variable, F(x).

Progressions of state transitions are shown together arising from a common starting point. State transitions vary depending upon the starting state. F(x) represents the CDF, underscoring the fact that the total sequence of state transitions cannot exceed 1.0. Each column of circles represents one step in F(x) of the smallest allowed state transition unit, in this case '0.01'. Four dotted arrows emanate from the point labeled 'Start.' These represent four of the five possible initial state transitions in FIG. 21. Since the different possible state transitions represent varying jumps in F(x), their length in the figure varies accordingly. In fact, the fifth possible transition from 'Start' is not shown because it would extend well beyond the right edge of the figure. The solid arrows in FIG. 22 represent possible state transitions. Notice that as we move from left to right in the figure there is an increase in state transition activity. For example, transitions from the state labeled '0.05' are beginning to come into play at F(x)=0.06. As we progress further, the trellis will fill out completely.

We apply a form of dynamic programming referred to as the Viterbi algorithm to discard quantizer configurations that seem less plausible when multiple paths converge on the same node; we eliminate all but the "best" one. The configuration that does not get eliminated is called a survivor. It is better than the other competing paths according to a cost function. We use training data, which is a pre-specified subset of the total data to be embedded where each symbol is known, to evaluate the cost function. The training data is embedded using the same set of quantizers as the regular information-carrying data.

A good cost function should measure the plausibility of a particular quantizer configuration given any data available to evaluate it. To be consistent with terminology of the Viterbi algorithm, the cost function is a path metric that is composed of individual branch metrics. Each branch metric is evaluated using all training data that has the same label (binary value) as the reference centroid and that is in close proximity to the centroid. To be more specific, we consider the "evaluation interval" for the $j^{th}$ branch metric to be bounded below by $C_{j,L}$, the centroid immediately below the reference centroid, and bounded above by $C_{J,H}$, the centroid immediately above the reference. We expect most data that is embedded using the reference centroid to be within its evaluation interval during quantizer recovery. In our implementation the branch metric is comprised of two components: the first of these controls the coarse shape of the configuration, while the second governs finer details.

The coarse control branch metric interprets the candidate configuration segment and measures its consistency with the observed distribution of training data within the evaluation interval. If the quantizer configuration under consideration is correct, the relative amount of data that lives within any of its available intervals should be close to the difference in F(x) of the high centroid's position and the low centroid's position. Using the relative amount of valid training data found within the evaluation interval with respect to the total amount of training data with the same message type, we evaluate the centroid according to equation 9.

$$M_j = \left| c_{j,H} - c_{j,L} - \frac{N_j}{N} \right| \quad (9)$$

$N_j$ is the amount of training data in the evaluation interval of the right message type, and N is the total count of training data in the image of the same message type.

The fine control branch metric is required in situations where competing paths have identical, or very close, evaluation intervals but different reference centroids. This occurs when the competing paths have two consecutive state transitions that add to the same total value of F(x). Physically, the competing paths will result in different decision boundaries being applied to the reference centroid. The correct decision boundaries should result in the lowest error rate for the data that is embedded using the reference centroid. Our fine control branch metric is the error rate of the training data in the evaluation interval.

Example Implementation

CDF Calculation

The CDF is calculated using all available reference locations in each block that is currently being embedded. The reference locations are controlled by a location key. One quarter of the total number of available locations within a block are reference locations; and these locations are chosen pseudo-randomly when the key is created. The CDF is generated from the histogram of the reference locations within the block according to equation 1. The histogram bins range from 0 to 255 in steps of one.

Quantizer Configuration

The first quantizer centroid is the nearest position in luminance to the last point where $F(x)$ is equal to zero. The remaining centroids are assigned according to the finite state machine procedure described previously. We configure the quantizers using two different choices for the parameter that controlled the target separation in luminance. When increasing the target spacing we fix the embedding distortion and increase the distortion compensation. The finite state machine consists of the states [0.01; 0.03; 0.05; 0.07; 0.1; 0.15; 0.2]. The permissible state transitions are defined by a simple rule. From any given starting state, a state transition can cross no more than one adjacent state. For example, if the system is in state '0.07' it can transition to any state from state '03' to '0.15'. The output of the "Configure Quantizers" block is actually one "mother" quantizer. The message quantizer that represents '1' is formed from the mother quantizer by taking all even centroids. The message quantizer for '0' bits is formed from odd centroids.

Message Coding (Quantization-based Embedding)

Three-quarters of the area in each image is available for data-embedding since one-quarter is used for reference purposes. The message coding procedure itself is quantization-based with variable distortion compensation. When applied to any given element, distortion compensation results in a weighted combination of that element before and after quantization. The weighting parameter, which we refer to as alpha, has a range between zero and one, where a zero value means that no image alteration is performed and a one means that full quantization is used.

The quantizers used for message encoding are generally non-uniform due to the fact that the quantizer configuration block varies in its ability to meet the desired target spacing between bins. In locations where the resultant centroid spacing is too large, we use distortion compensation in an amount that varies with the spacing to control watermark energy in such areas. To carry this out, we consider the range of luminance that would be quantized to any particular centroid. The range is partitioned into a region where data is quantized from below, and a region where data is quantized from above. For each of these two regions, the mean distortion is calculated that would occur if we quantized all data in the region to the centroid. The amount of distortion compensation to use, alpha, is calculated by dividing the measured mean distortion by the target distortion. If alpha is greater than one it is reset to one. The procedure yields two different distortion compensation values per centroid, one for the region above and one for the region below.

EXPERIMENTS

Experimental Setup

Figure 26:
FIG. 26 illustrates four test images (clockwise starting at top left: "mandrill," "bridge and stream," "Lena" and "sailboats").

We used four test images illustrated in FIG. 26 to evaluate our technique.

The images are of size 512×512.

The images are tiled into 128×128 blocks. The watermarking algorithms are applied to each block independently.

We assume perfect quantizer recovery.

We used two different target centroid spacings in implementation of our algorithm.

We increased the amount of distortion compensation in the configuration with larger spacing in order to maintain equal embedding distortion.

In addition to the lattice code method, we use an additive spatial spread spectrum (SS) watermark for comparison.

Each element(chip) of the SS watermark is recovered after applying a prefilter in order to reduce the host image interference. Examples of these types of filters can be found in watermarking literature.

We report error rates of the individual elements

Each quantized pixel for the lattice code.

the chip error rate for the spread spectrum watermark.

The watermarks are normalized by MSE to the same embedding strength. Distortions applied in our experiments include additive Gaussian noise, gamma correction, and rotation.

All distortions are applied in Matlab.

Gamma correction applied to test method's resilience to amplitude modification.

Non-amplitude modifying distortions are applied to determine the amount of image dependency that is a result of non-uniform luminance domain quantization bin assignments.

Experimental Results

Figure 23:
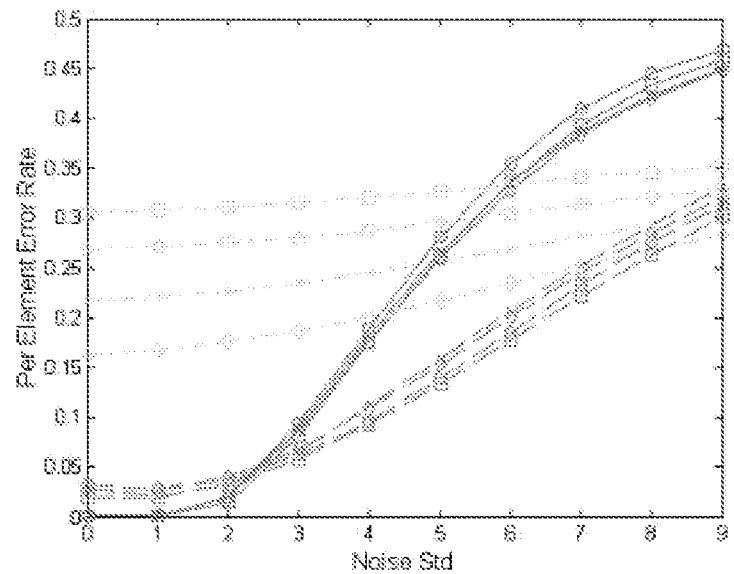
FIG. 23 is a diagram illustrating robustness of digital watermarking techniques to Guassian noise.
Figure 24:
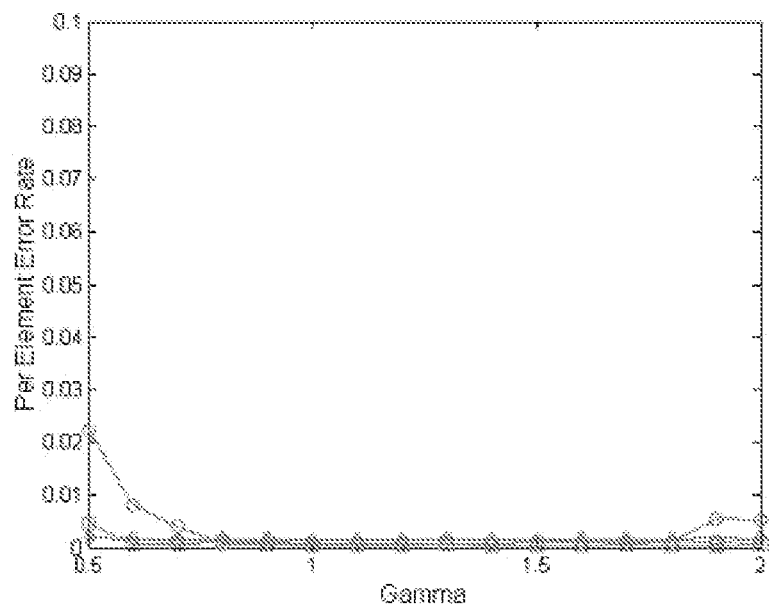
FIG. 24 is a diagram illustrating robustness of a digital watermarking technique to a form of amplitude modification.
Figure 25:
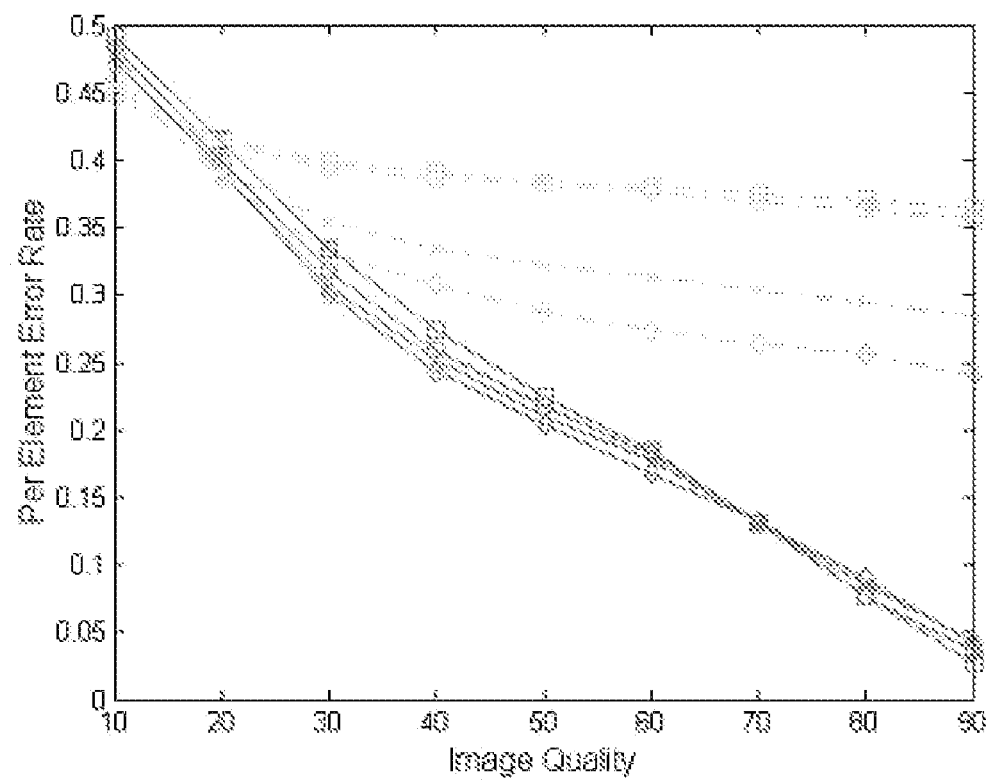
FIG. 25 is a diagram illustrating robustness of a digital watermarking technique to a form of lossy compression.

The following symbol descriptions are used for all plots in FIGS. 23-25. Image legend: 'square' equals 'mandrill', 'circle' equals 'bridge and stream', 'x' equals 'sailboats', 'diamond' equals 'Lena' (images shown in FIG. 26).

FIG. 23 illustrates robustness of the methods to additive Gaussian noise. In particular, FIG. 23 contains results for the different watermarking methods when pseudo-random white Gaussian noise of zero mean and a range of different standard deviations is added after embedding. The x-axis of the figure shows the range of noise standard deviation, and the y-axis is the per element error rate. In the figure, the '-.' lines represent the performance of the spatial spread spectrum watermark recovered using a pre-filter (SS-PF). The solid lines represent the performance of image adaptive lattice codes (IALC), which is the technique under investigation, and the dotted lines represent the same technique when wide bin spacings—more distortion compensation—is used (IALC-DC). In all cases the watermark standard deviation is 7.

We observe that the relative performance of each of the methods depends upon the noise standard deviation. Although the IALC method performs best at low levels of additive noise, it is the worst performer of the three at higher levels. When large bin spacings are used, the effects of additive noise on the system are much less adverse. This is illustrated by the performance of IALC-DC, which is the overall best performer in the evaluated range of noise standard deviation. The performance of the SS-PF scheme worsens in a very gradual fashion with increasing noise levels. Intuitively, this can be understood by taking into consideration the fact that the dominant source of noise in the SS-PF scheme is the host image itself. Additional noise with standard deviation given by our experimental range is small in comparison to the dominant noise source. Another aspect of this issue is that the host image contributes more or less noise based upon its level of textural activity. One might argue that watermark recovery using the SS-PF method correlates well with textural activity. According to the detector, the ranking in order of busiest to least busy is mandrill, bridge and stream, sailboats, and lena. In contrast with the SS-PF method, the adaptive lattice methods are not affected by host image characteristics in the presence of additive noise. There is a small consistent variation in performance across images, but this is attributed to the resulting non-uniformity of the quantizers, not the host image characteristics.

FIG. 24 illustrates the robustness of the IALC method to gamma correction when the watermark standard deviation is 7. Gamma correction is one example of a common, yet relatively severe amplitude modification. The range of gamma we selected, 0.5 to 2, encompasses a range larger than one might typically find in practice. This range comprises the x-axis of the corresponding figure.

The IALC method results under gamma correction are very encouraging. The resulting error rate is under 1% in all cases but one. In the one exception, the error rate is approximately 2%, which occurs at gamma equal to 0.5 for the bridge and stream image. Relative to the other image, the bridge and stream image has a compressed dynamic range, which is probably why it is more susceptible to errors under gamma correction.

FIG. 25 illustrates robustness of the methods to JPEG compression when the watermark standard deviation is 4. Matlab supports a variety of output file types for image data. Among these is JPEG, where one is required to specify a quality factor between 10, lowest image quality, and 100, highest image quality (lossless compression). For our experiment, we used quality factors of 10 to 90 in increments of 10. We performed our experiment using IALC and SS-PF watermarks.

Compression results are similar to those obtained when Gaussian noise is added. The IALC scheme does very well, and as with Gaussian noise, there doesn't appear to be much image dependency. It is better than SS-PF for quality factors higher than 20.

We have described an algorithm that makes lattice codes resilient to amplitude modifications by assigning the constituent quantizer centroids fixed values according to the image CDF. A finite state machine is used for the assignments in order to approximate a uniform spacing of centroids. We have also described two approaches for quantizer recovery at the watermark detector. We have shown that our technique handles gamma correction. In addition, our results indicate that the behavior of our method is consistent across images under additive Gaussian noise and JPEG compression. These methods of using state machines for quantizer assignment, and dynamic programming for quantizer recover extend to different media types, including audio, different classes of distortion modifications, and different types of host signal projections selected to address distortions for a particular application.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for quantization based data embedding into a host signal comprising:
   mapping the host signal from a first domain into a mapped signal in a second domain that is robust to a class of amplitude modifications that are order preserving; and
   performing quantization based embedding of auxiliary data into the host signal using quantization bins derived from the second domain that are robust to the amplitude modifications.

2. The method of claim 1 wherein mapping comprising computing a cumulative distribution function of the host signal to compute the mapped signal.

3. The method of claim 1 wherein the quantization based embedding embeds the auxiliary data by adjusting values of the host signal such that the adjusted values fall into bins corresponding to auxiliary data symbols to be embedded.

4. The method of claim 3 wherein spacing of the bins is at least initially uniform in the second domain, and is non-uniform in the first domain.

5. The method of claim 3 including adapting spacing of the bins in the first domain to make the spacing more uniform in the first domain.

6. The method of claim 5 including embedding a reference signal comprising known auxiliary data values for use in deriving bin arrangement in an auxiliary data reader.

7. The method of claim 3 including using a finite state machine to assign the bins.

8. A computer readable medium having instructions stored thereon, which, when executed by a computer, perform the method of claim 1.

9. A method for quantization based data embedding into a host signal comprising:
   mapping the host signal from a first domain into a mapped signal in a second domain that is robust to a class of amplitude modifications that are order preserving;
   projecting the mapped signal onto a pseudo random vector; and
   performing a quantization based embedding on the projection of the mapped signal onto the pseudo random vector.

10. The method of claim 9 wherein the host signal is partitioned into vectors of elements, and each vector is projected onto a corresponding pseudorandom vector.

11. The method of claim 10 wherein the vectors of elements are selected from pseudorandom locations in the host signal.

12. The method of claim 9 including performing a weighted projection onto the pseudorandom vector.

13. The method of claim 12 wherein weights used in the weighted projection are derived from the host signal so as to increase robustness of the embedded data or perceptual quality of the host signal after embedding.

14. The method of claim 12 wherein weights used in the weighted projection are computed so as to be derivable from the host signal after embedding and distortion of the host signal.

15. The method of claim 12 including embedding a reference signal comprising known auxiliary values for use in deriving the weights in an auxiliary data reader for reading the embedded data from the host signal.

16. A computer readable medium having instructions stored thereon, which, when executed by a computer, perform the method of claim 9.

17. A method of reading auxiliary data embedded in a host signal comprising:
mapping the host signal from a first domain into a mapped signal in a second domain that is robust to a class of amplitude modifications that are order preserving; and
performing quantization based reading of auxiliary data embedded into the host signal using quantization bins derived from the second domain that are robust to the amplitude modifications.

18. The method of claim 17 including:
using a reference signal values embedded into the host signal to derive the quantization bins.

19. The method of claim 18 wherein the reference signal comprises training data embedded using quantization based embedding.

20. The method of claim 17 including using dynamic programming to predict the quantization bins.

21. The method of claim 17 including using a structured search through possible state transitions to predict the quantization bins.

22. The method of claim 21 including using a Viterbi method to predict the quantization bins.

23. A computer readable medium having instructions stored thereon, which, when executed by a computer, perform the method of claim 17.

24. A method of reading auxiliary data embedded in a host signal comprising:
mapping the host signal from a first domain into a mapped signal in a second domain that is robust to a class of amplitude modifications that are order preserving;
projecting the mapped signal onto a pseudo random vector; and
performing a quantization based reading of the auxiliary data embedded in a projection of the mapped signal onto the pseudo random vector.

25. The method of claim 24 wherein the host signal is partitioned into vectors of elements, and each vector is projected onto a corresponding pseudorandom vector.

26. The method of claim 25 wherein the vectors of elements are selected from pseudorandom locations in the host signal.

27. The method of claim 24 including performing a weighted projection onto the pseudorandom vector.

28. The method of claim 27 wherein weights used in the weighted projection are derived from the host signal so as to increase robustness of the embedded data or perceptual quality of the host signal after embedding.

29. The method of claim 27 wherein weights used in the weighted projection are computed so as to be derivable from the host signal after embedding and distortion of the host signal.

30. The method of claim 27 including reading an embedded reference signal comprising known auxiliary values for use in deriving the weights.

31. A computer readable medium having instructions stored thereon, which, when executed by a computer, perform the method of claim 24.

32. A method for quantization based data embedding into a host signal comprising:
mapping the host signal from a first domain into a mapped signal in a second domain that is robust to a class of modifications; and
performing quantization based embedding of auxiliary data into the host signal using quantization bins derived from the second domain that are robust to the modifications, including using a finite state machine to derive the bins.

33. A method of reading auxiliary data embedded in a host signal comprising:
mapping the host signal from a first domain into a mapped signal in a second domain that is robust to a class of modifications; and
performing quantization based reading of auxiliary data embedded into the host signal using quantization bins derived from the second domain that are robust to the modifications.

34. The method of claim 33 including:
using a secondary watermark to carry information about state transitions from which the quantization bins are computed.

35. The method of claim 33 including using dynamic programming to predict the quantization bins.

36. The method of claim 33 including using a structured search through possible state transitions to predict the quantization bins.

37. The method of claim 33 including using a Viterbi method to predict the quantization bins.

38. A computer readable medium having instructions stored thereon, which, when executed by a computer, perform the method of claim 33.

* * * * *

UNITED STATES PATENT AND TRADEMARK OFFICE
CERTIFICATE OF CORRECTION

PATENT NO. : 7,376,242 B2  
APPLICATION NO. : 10/742637  
DATED : May 20, 2008  
INVENTOR(S) : Brett A. Bradley and John Stach Page 1 of 1

It is certified that error appears in the above-identified patent and that said Letters Patent is hereby corrected as shown below:

ON THE TITLE PAGE

Item (63), under "Related U.S. Application Data" delete lines 1-3 and insert the following:

--Related U.S. Application Data

(63) Continuation-in-part of application No. 10/469,474, filed Jun. 14, 2004, which is the Nationalization of PCT Application No. PCT/US02/08844, filed Mar. 22, 2002, which claims priority to U.S. Patent Appl. 09/895,867, filed Jun. 28, 2001 (now U.S. Patent No. 6,483,927).--

Signed and Sealed this

Thirty-first Day of July, 2012

David J. Kappos
*Director of the United States Patent and Trademark Office*